(12) United States Patent
Ye et al.

(10) Patent No.: US 10,354,307 B2
(45) Date of Patent: Jul. 16, 2019

(54) METHOD, DEVICE, AND SYSTEM FOR OBTAINING INFORMATION BASED ON AUDIO INPUT

(71) Applicant: TENCENT TECHNOLOGY (SHENZHEN) COMPANY LIMITED, Shenzhen, Guangdong (CN)

(72) Inventors: Wa Ye, Shenzhen (CN); Zhenyu Xu, Shenzhen (CN); Bo Sun, Shenzhen (CN); Jing Zang, Shenzhen (CN); Zhuo Tang, Shenzhen (CN); Hongyang Wang, Shenzhen (CN); Keren Li, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 456 days.

(21) Appl. No.: 15/168,595

(22) Filed: May 31, 2016

(65) Prior Publication Data
US 2016/0275588 A1 Sep. 22, 2016

Related U.S. Application Data

(63) Continuation of application No. PCT/CN2015/070333, filed on Jan. 8, 2015.

(30) Foreign Application Priority Data

Jun. 13, 2014 (CN) .......................... 2014 1 0265512

(51) Int. Cl.
*G06Q 30/00* (2012.01)
*G06Q 30/06* (2012.01)
(Continued)

(52) U.S. Cl.
CPC ....... *G06Q 30/0625* (2013.01); *G06F 3/0488* (2013.01); *G10L 15/083* (2013.01);
(Continued)

(58) Field of Classification Search
None
See application file for complete search history.

(56) References Cited

U.S. PATENT DOCUMENTS

| 5,473,759 A | 12/1995 | Slaney et al. |
| 6,092,039 A | 7/2000 | Zingher |

(Continued)

FOREIGN PATENT DOCUMENTS

| CN | 1592906 B | 9/2010 |
| CN | 102053998 A | 5/2011 |

(Continued)

OTHER PUBLICATIONS

"Highly Robust Audio Fingerprinting System" Haitsma J, Kalker T.A, International Conference onMusic, dated Oct. 15, 2002.

(Continued)

*Primary Examiner* — Mila Airapetian
(74) *Attorney, Agent, or Firm* — Baker & Hostetler LLP

(57) ABSTRACT

A Method and a device for obtaining information based on an audio input are disclosed. The method is performed at an electronic device having one or more processors and memory. The method includes: while running a social networking application, sending a first audio input to a server hosting the social networking application, wherein the first audio input is captured in response to a triggering event; retrieving, from the server, a product information item associated with a product identified based on the first audio input, wherein the product information item is obtained by comparing at least one audio feature of the first audio input with signature audio features extracted from audio of TV or (Continued)

radio broadcast within a predetermined time span; and displaying the retrieved product information item to a user of the electronic device within the social networking application.

20 Claims, 23 Drawing Sheets

(51) Int. Cl.
    *H04N 21/233*     (2011.01)
    *H04H 60/37*     (2008.01)
    *H04N 21/254*     (2011.01)
    *H04N 21/439*     (2011.01)
    *H04N 21/4722*     (2011.01)
    *H04N 21/81*     (2011.01)
    *G06F 3/0488*     (2013.01)
    *H04N 21/422*     (2011.01)
    *H04N 21/8545*     (2011.01)
    *G10L 15/08*     (2006.01)
    *G10L 17/22*     (2013.01)
    *G10L 21/14*     (2013.01)
    *H04H 60/58*     (2008.01)
    *H04H 60/63*     (2008.01)
    *G06Q 50/00*     (2012.01)
    *G10L 25/57*     (2013.01)
    *G10L 25/54*     (2013.01)

(52) U.S. Cl.
    CPC .............. *G10L 17/22* (2013.01); *G10L 21/14* (2013.01); *H04H 60/375* (2013.01); *H04N 21/233* (2013.01); *H04N 21/2542* (2013.01); *H04N 21/4222* (2013.01); *H04N 21/4394* (2013.01); *H04N 21/4722* (2013.01); *H04N 21/812* (2013.01); *H04N 21/8545* (2013.01); *G06Q 50/01* (2013.01); *G10L 25/54* (2013.01); *G10L 25/57* (2013.01); *H04H 60/58* (2013.01); *H04H 60/63* (2013.01); *H04H 2201/90* (2013.01)

(56) References Cited

U.S. PATENT DOCUMENTS

| | | | |
|---|---|---|---|
| 7,277,766 | B1 | 10/2007 | Khan et al. |
| 7,698,138 | B2 | 4/2010 | Kato |
| 2002/0083060 | A1 | 6/2002 | Wang et al. |
| 2005/0149321 | A1 | 7/2005 | Kabi et al. |
| 2007/0124756 | A1 | 5/2007 | Covell |
| 2007/0195963 | A1 | 8/2007 | Ko et al. |
| 2007/0294295 | A1 | 12/2007 | Finkelstein et al. |
| 2009/0177466 | A1 | 7/2009 | Rui et al. |
| 2009/0205483 | A1 | 8/2009 | Kim |
| 2009/0271182 | A1 | 10/2009 | Athineos et al. |
| 2011/0069937 | A1 | 3/2011 | Toerner |
| 2011/0173208 | A1 | 7/2011 | Vogel |
| 2011/0307085 | A1 | 12/2011 | Selby et al. |
| 2014/0047355 | A1* | 2/2014 | Yerli .................. G06F 3/048 715/753 |
| 2014/0372210 | A1* | 12/2014 | Watfa ................ G06Q 30/0251 705/14.49 |
| 2015/0170245 | A1* | 6/2015 | Scoglio .............. G06Q 30/0623 705/14.55 |

FOREIGN PATENT DOCUMENTS

| | | |
|---|---|---|
| CN | 102063904 A | 5/2011 |
| CN | 102332262 A | 1/2012 |
| CN | 102479505 A | 5/2012 |
| CN | 103200429 A | 7/2013 |
| CN | 103237260 A | 8/2013 |
| CN | 103618953 A | 3/2014 |
| CN | 103747293 A | 4/2014 |
| CN | 104023247 A | 9/2014 |
| JP | 62-159195 | 7/1987 |
| JP | 2005524108 A | 8/2005 |
| JP | 2006106535 A | 4/2006 |
| JP | 2009518884 A | 5/2009 |
| KR | 20090083098 A | 8/2009 |
| TW | 201222526 A | 6/2012 |
| TW | 201248450 A | 12/2012 |
| WO | 0104870 A1 | 1/2001 |
| WO | 0211123 A2 | 2/2002 |

OTHER PUBLICATIONS

Notification of the First Office Action of Chinese application No. 201310042408.0, dated Feb. 10, 2015.
English Translation of Notification of the First Office Action of Chinese application No. 201310042408.0, dated Feb. 10, 2015.
Notification of the Second Office Action of Chinese application No. 201310042408.0, dated Jun. 3, 2015.
English Translation of Notification of the Second Office Action of Chinese application No. 201310042408.0, dated Jun. 3, 2015.
Tencent Technology, ISR, PCT/CN2013/085309, Jan. 2, 2014, 4pgs.
Tencent Technology, Written Opinion, PCT/CN2013/085309, dated Mar. 13, 2014, 4pgs.
Tencent Technology, IPRP, PCT/CN2013/085309, Nov. 3, 2015, 4pgs.
Notification of the First Office Action of Korean application No. 10-2016-7018721, dated May 1, 2017, and English translation.
International Search Report in international application No. PCT/CN2015/070333, dated Apr. 24, 2015.
English Translation of the Written Opinion of the International Search Authority in international application No. PCT/CN2015/070333, dated Apr. 24, 2015.

* cited by examiner

Wherein:

the first audio input comprises an audio recording of at least a portion of a first advertisement for a product broadcast on TV at a first time;

the at least one audio feature of the first audio input matches a first signature audio feature extracted from the first advertisement for the product broadcast on TV on a first channel at the first time; and the product information item is identified based on advertisement information associated with the first channel and the first time.

~ 2208

Wherein:

the trigger event includes receiving a voice instruction from the user of the electronic device, the voice instruction including one or more keywords;

the first audio input comprises an audio recording of at least a portion of a first program broadcast on TV at a first time;

the at least one audio feature of the first audio input matches a first signature audio feature extracted from the first program broadcast on TV on a first channel at the first time; and the product information item is identified based on the first channel, the first time, and the one or more keywords.

METHOD, DEVICE, AND SYSTEM FOR OBTAINING INFORMATION BASED ON AUDIO INPUT

CROSS REFERENCE TO RELATED APPLICATIONS

This is a continuation application of International Patent Application No. PCT/CN2015/070333, filed on Jan. 8, 2015, which claims priority to Chinese Patent Application No. 201410265512.0, filed on Jun. 13, 2014 and entitled "METHOD AND SYSTEM FOR OBTAINING AND PUSHING INFORMATION AND SYSTEM FOR INFORMATION INTERACTION", which are incorporated herein by reference in their entireties.

The Chinese Patent Application No. 201410265512.0 claims priority to Chinese Patent Application No. 201410235379.4, filed on May 29, 2014 and entitled "METHOD, DEVICE, SERVER, AND SYSTEM FOR OBTAINING INTERACTION INFORMATION", and claims priority to Chinese Patent Application No. 201410241073.X, filed on May 30, 2014 and entitled "METHOD, DEVICE, SERVER, AND SYSTEM FOR INTERACTION BASED ON VIDEO", which are incorporated herein by reference in their entireties.

This application is further related to Chinese Patent Application No. CN201310042408.0, entitled "METHOD AND DEVICE FOR AUDIO RECOGNITION", filed on Feb. 4, 2013, and its related U.S. patent application Ser. No. 14/103,753, entitled "METHOD AND DEVICE FOR AUDIO RECOGNITION", filed on Dec. 11, 2013, the entirety of which are incorporated herein by reference.

TECHNICAL FIELD

The present application relates to the field of Internet technologies, and in particular, to a method and device for obtaining information based on an audio input using a social network application.

BACKGROUND

Currently, when a real-time program is broadcasted on a television channel, information conveyed by the program content cannot be memorized by a user within a short time. Generally in consideration of cost, content in a television program is broadcasted briefly and quickly. Therefore, it is desired to have an efficient and effective method and device for obtaining information from the real-time program.

SUMMARY

A method for obtaining information by scanning a two-dimensional code can be used to obtain information from a real-time program. In some embodiments, a two-dimensional code embedded with information according to the program is generated and displayed in a broadcast television program. A user can scan the dimensional code to obtain the information, and parse the two-dimensional code with a device such as a mobile phone.

However, because a television generally displays an image for limited time duration, e.g., several seconds, a two-dimensional code may not be correctly recognized when the two-dimensional code is too small or too large. Besides, currently many televisions display an image using a row scanning and imaging technology. In this way, a "scanning line" appears when a two-dimensional code is scanned by a device such as a mobile phone. Therefore, it is difficult to effectively recognize information included in the two-dimensional code displayed in a television program on a screen. Therefore, the conventional information obtaining method may not be effective.

The embodiments of the present disclosure provide a method and device for obtaining information based on an audio input using a social networking application. In some embodiments, a method for obtaining information based on an audio input is performed at an electronic device (e.g., electronic device 104, FIGS. 1 and 3) having one or more processors and memory. The method includes: while running a social networking application: sending a first audio input to a server hosting the social networking application, wherein the first audio input is captured in response to a triggering event; retrieving, from the server, a product information item associated with a product identified based on the first audio input, wherein the product information item is obtained by comparing at least one audio feature of the first audio input with signature audio features extracted from audio of TV or radio broadcast within a predetermined time span; and displaying the retrieved product information item to a user of the electronic device within the social networking application.

In some embodiments, an electronic device (e.g., electronic device 104, FIGS. 1 and 3), includes one or more processors, and memory storing one or more programs for execution by the one or more processors, the one or more programs include instructions for performing the operations of any of the methods described herein.

In some embodiments, a non-transitory computer readable storage medium storing one or more programs, the one or more programs comprising instructions, which, when executed by an electronic device (e.g., electronic device 104, FIGS. 1 and 3), cause the electronic device to perform the operations of any of the methods described herein. In some embodiments, an electronic device (e.g., electronic device 104, FIGS. 1 and 3) includes means for performing, or controlling performance of, the operations of any of the methods described herein.

Various advantages of the present application are apparent in light of the descriptions below.

BRIEF DESCRIPTION OF THE DRAWINGS

For a better understanding of the aforementioned aspects of the application as well as additional aspects and embodiments thereof, reference should be made to the Detailed Description below, in conjunction with the following drawings in which like reference numerals refer to corresponding parts throughout the figures.

FIGS. 22A-22D are flowchart diagrams illustrating a method of obtaining information based on an audio input in accordance with some embodiments.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide an understanding of the subject matter presented herein. But it will be apparent to one skilled in the art that the subject matter may be practiced without these specific details or in alternative suitable manners. In other instances, well-known methods, procedures, components, and circuits have not been described in detail so as not to unnecessarily obscure aspects of the embodiments.

The technical solutions of the present application will be described in the following with reference to the accompanying drawings. It is obvious that embodiments to be described are only a part rather than all of the embodiments of the present application. All other embodiments obtained by a person of ordinary skill in the art based on the embodiments of the present application without creative efforts shall fall within the protection scope of the present application.

Figure 1A:
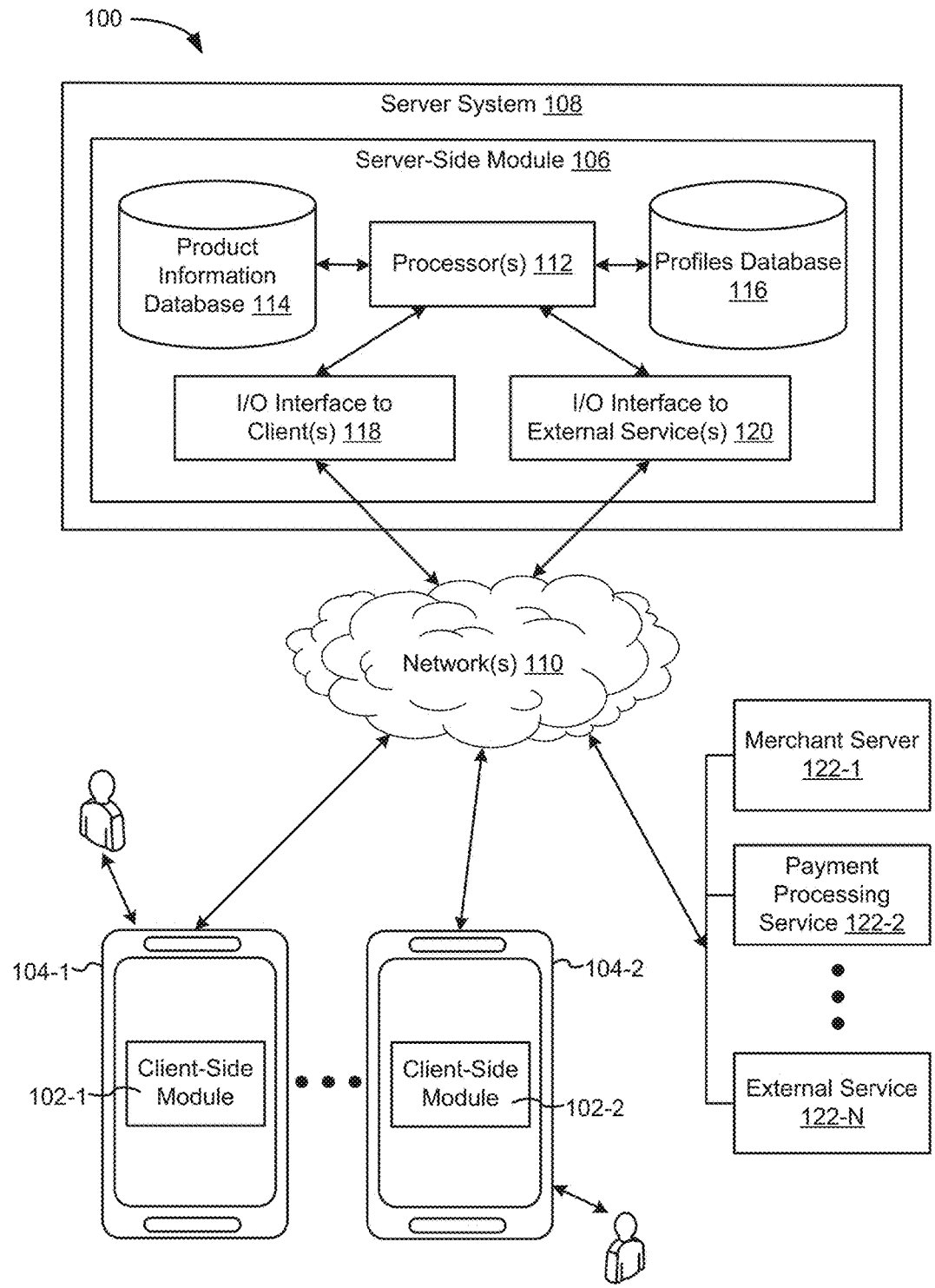
FIG. 1A is a block diagram illustrating exemplary embodiments of server-electronic device environments in accordance with some embodiments.

FIG. 1A is a block diagram illustrating a server-electronic device environment 100 in accordance with some embodiments. In some embodiments, server-client environment 100 includes client-side processing 102-1, 102-2 (hereinafter "client-side module 102") executed on an electronic device 104-1, 104-2, and server-side processing 106 (hereinafter "server-side module 106") executed on a server system 108. Client-side module 102 communicates with server-side module 106 through one or more networks 110. Client-side module 102 provides client-side functionalities for the social networking platform (e.g., instant messaging, audio recording, social networking services, and payment processing) and communications with server-side module 106. Server-side module 106 provides server-side functionalities for the social networking platform (e.g., instant messaging, social networking services, request processing, and payment processing) for any number of client modules 102 each residing on a respective client device 104.

In some embodiments, server-side module 106 includes one or more processors 112, transaction information database 114, profiles database 116, an I/O interface to one or more clients 118, and an I/O interface to one or more external service 122, such as merchant server 122-1, payment processing service 122-2. I/O interface to one or more clients 118 facilitates the client-facing input and output processing for server-side module 106. One or more processors 112 obtain requests from one or more electronic devices 104, process the requests, identify information in response to the requests, and send the identified information to device modules 102 of one or more electronic devices 104. Product information database 114 stores a plurality of product information items, and profiles database 116 stores a user profile for each user of the social networking platform. I/O interface to one or more external services 120 facilitates communications with one or more external services 122 (e.g., merchant websites, credit card companies, and/or other payment processing services).

Examples of electronic device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

Server-client environment 100 shown in FIG. 1 includes both a client-side portion (e.g., client-side module 102) and a server-side portion (e.g., server-side module 106). In some embodiments, data processing is implemented as a standalone application installed on client device 104. In addition, the division of functionalities between the client and server portions of client environment data processing can vary in different embodiments. For example, in some embodiments, client-side module 102 is a thin-client that provides only user-facing input and output processing functions, and delegates all other data processing functionalities to a backend server (e.g., server system 108).

Figure 1B:
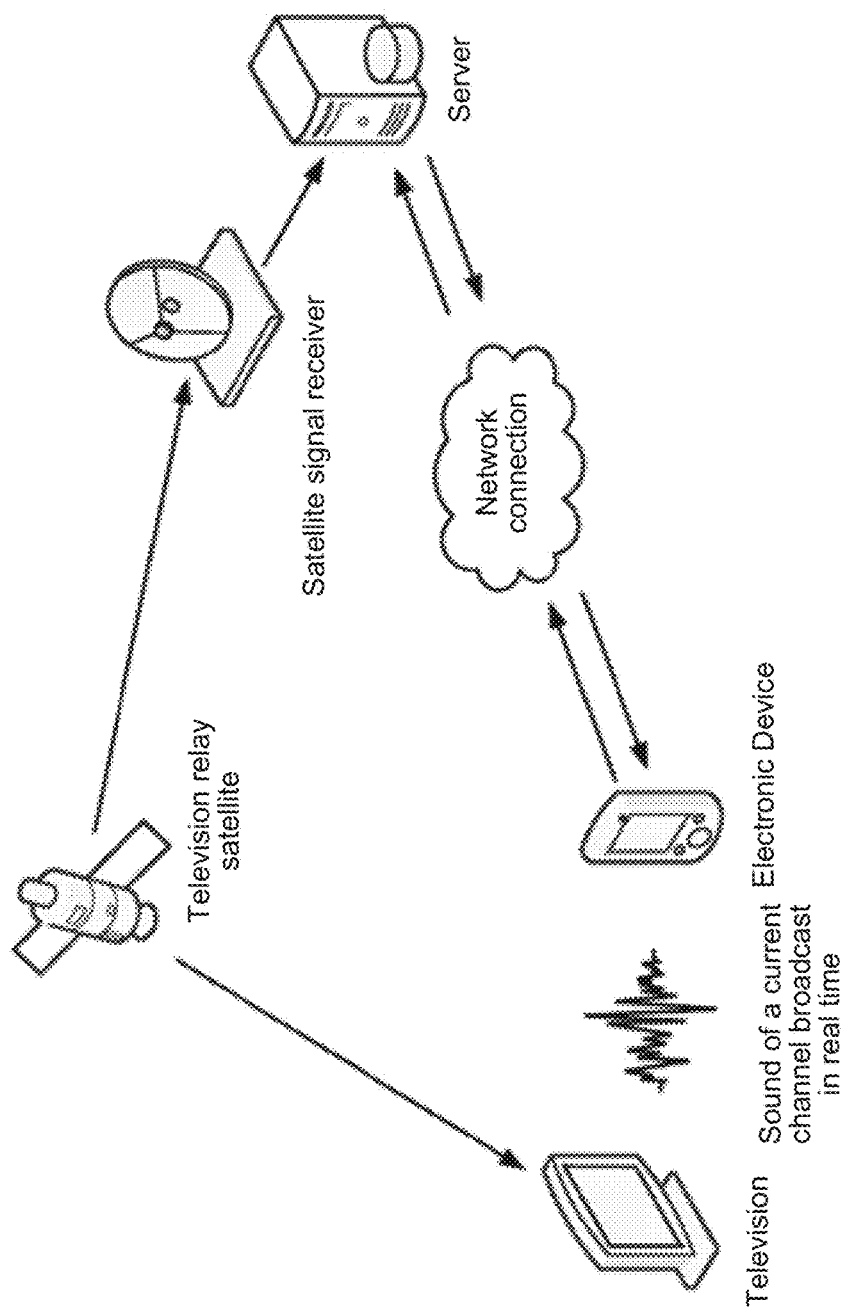
FIG. 1B is a schematic diagram of a working environment of an information obtaining system in accordance with some embodiments.

Referring to FIG. 1B, a network environment includes an electronic device (e.g., electronic device 104, FIG. 1A) connected with a server (e.g., server system 108, FIG. 1A) through network (e.g., network 110, FIG. 1A). In some embodiments, the electronic device is within the vicinity of the television (TV), so that the electronic device can receive sound broadcast by the TV. The television receives a satellite signal broadcast by a television relay satellite in real time, converts the satellite signal to obtain audio stream data, and broadcasts the audio stream data to the user associated with the electronic device. The server is connected to a satellite signal receiver, which receives, in real time, a satellite signal broadcasted by the television relay satellite using the satellite signal receiver, and converts the satellite signal to obtain channel audio data and the associated information (e.g., product information, timestamp, channel information, etc.). The channel audio data includes a plurality of product information items associated with respective products that are promoted on one or more channels on the television. The server obtains the television channel audio data from the satellite signal receiver, and stores the information in a database, such as production information database 114.

Figure 2:
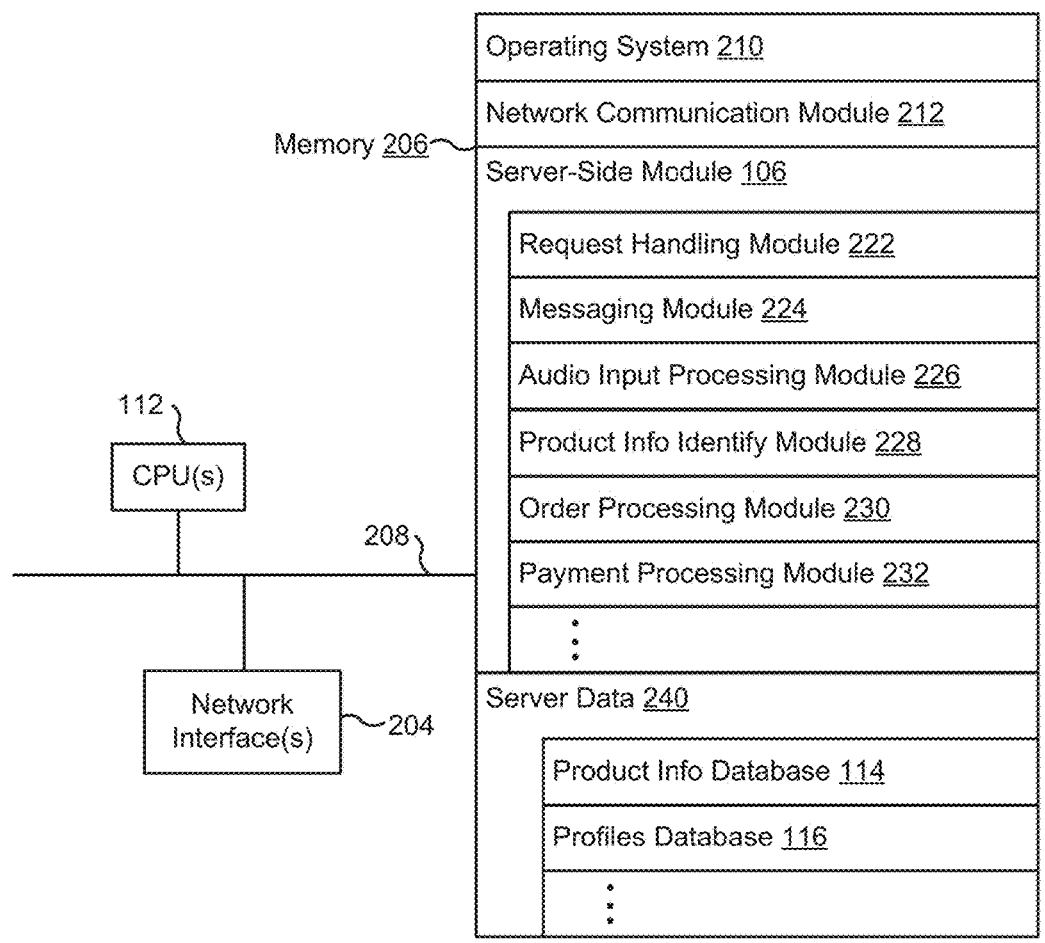
FIG. 2 is a block diagram of a server system in accordance with some embodiments.

FIG. 2 is a block diagram illustrating server system 108 in accordance with some embodiments. Server system 108, typically, includes one or more processing units (CPUs) 112, one or more network interfaces 204 (e.g., including I/O interface to one or more clients 118 and I/O interface to one or more external services 120), memory 206, and one or more communication buses 208 for interconnecting these components (sometimes called a chipset). Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- operating system 210 including procedures for handling various basic system services and for performing hardware dependent tasks;
- network communication module 212 for connecting server system 108 to other computing devices (e.g., client devices 104 and external service(s) 122) connected to one or more networks 110 via one or more network interfaces 204 (wired or wireless);
- server-side module 106, which provides server-side data processing for the social networking platform (e.g., instant messaging, requests processing, and/or social networking services), includes, but is not limited to:
    - request handling module 222 for handling and responding to various requests sent from electronic device 104, including requests for device identity information;
    - messaging module 224 for managing and routing messages sent between user accounts and device contacts of the social networking platform;
    - audio input processing module 226 for processing audio input(s) received from electronic device 104, such as using voice recognition technology or other suitable technology;
    - product info identifying module 228 for identifying product information items from product information database 114 based on the audio input received from electronic device 104;
    - order processing module 230, for processing order(s) submitted by the user of the social networking platform running on electronic device 104, such as the order corresponding to the product based on the audio input; and
    - payment processing module 232 for processing transactions for the user of the social networking platform based on payment data in a user profile in profiles database 116 corresponding to the respective user; and
- server data 240 storing data for the social networking platform, including but not limited to:
    - product information database 114 storing a plurality of product information entries (e.g., received from satellite signal receiver and processed to retrieve the product information, FIG. 1B); and
    - profiles database 116 storing user profiles for users of the social networking platform, where a respective user profile for a user includes a user/account name or handle, login credentials to the social networking platform, payment data (e.g., linked credit card information, app credit or gift card balance, billing address, shipping address, etc.), custom parameters (e.g., age, location, hobbies, etc.) for the user, social network contacts, groups of contacts to which the user belongs, and identified trends and/or likes/dislikes of the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
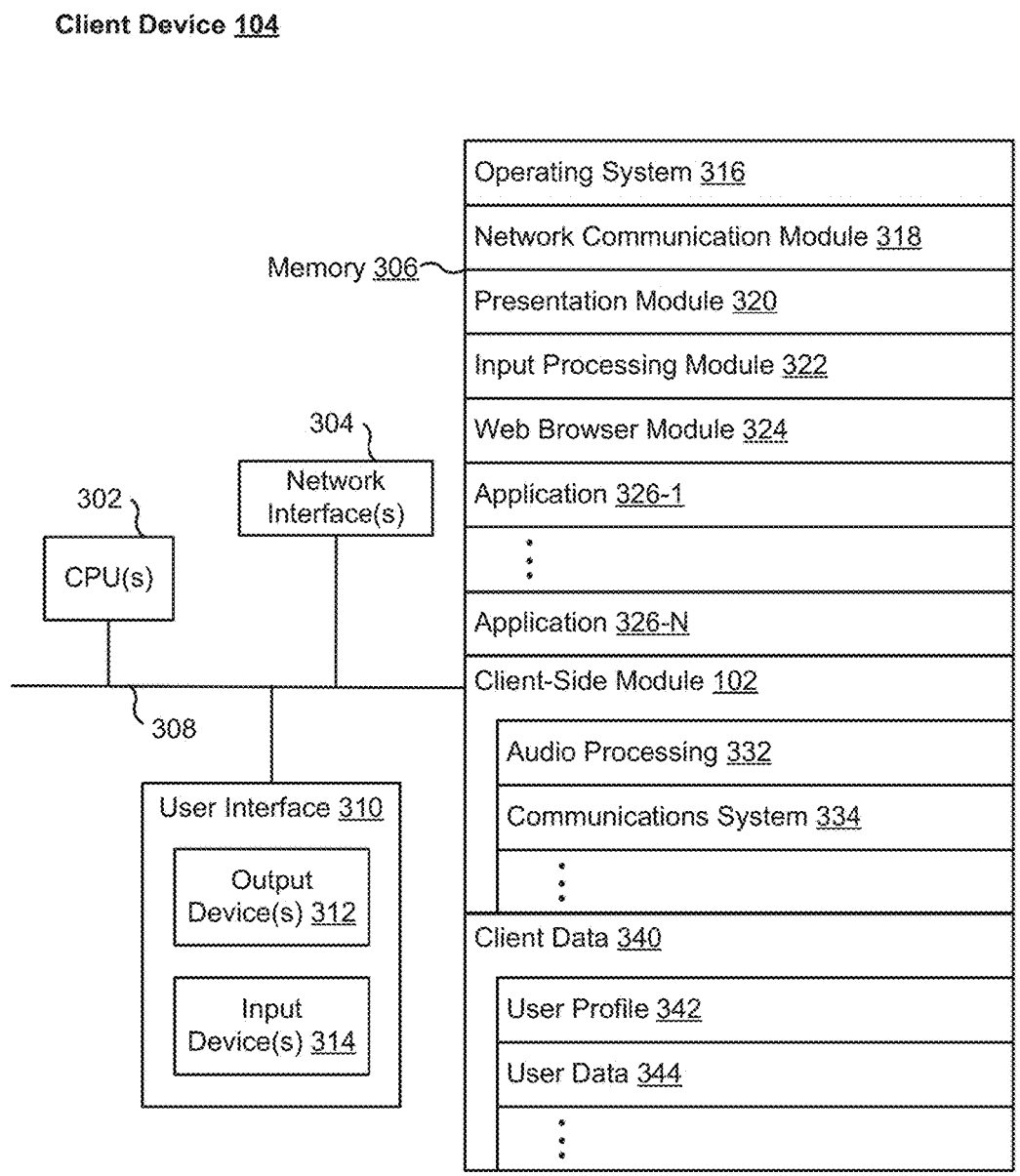
FIG. 3 is a block diagram illustrating exemplary embodiments of electronic devices in accordance with some embodiments.

FIG. 3 is a block diagram illustrating a representative client device 104 associated with a social networking user account in accordance with some embodiments. Client device 104, typically, includes one or more processing units (CPUs) 302, one or more network interfaces 304, memory 306, and one or more communication buses 308 for interconnecting these components (sometimes called a chipset). Client device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a camera, a gesture capturing camera, or other input buttons or controls. Furthermore, some client devices 104 use a microphone and voice recognition or a camera and gesture recognition to supplement or replace the keyboard.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:
- operating system 316 including procedures for handling various basic system services and for performing hardware dependent tasks;
- network communication module 318 for connecting client device 104 to other computing devices (e.g., server system 108 and external service(s) 122) connected to one or more networks 110 via one or more network interfaces 304 (wired or wireless);
- presentation module 320 for enabling presentation of information (e.g., a user interface for a social networking platform, widget, webpage, game, and/or application, audio and/or video content, text, etc.) at client device 104 via one or more output devices 312 (e.g., displays, speakers, etc.) associated with user interface 310;
- input processing module 322 for detecting one or more user inputs or interactions from one of the one or more input devices 314 and interpreting the detected input or interaction;
- web browser module 324 for navigating, requesting (e.g., via HTTP), and displaying websites and web pages thereof;
- one or more applications 326-1-326-N for execution by client device 104 (e.g., games, application marketplaces, payment platforms, and/or other applications); and
- client-side module 102, which provides client-side data processing and functionalities for the social networking platform, including but not limited to:
    - audio processing 332 for processing audio inputs received from user of the social networking application and/or the outside media (e.g., television), such as extracting product, time, and/or channel information of the audio inputs; and
    - communication system 334 for sending messages to and receiving messages from other users of the social networking platform (e.g., instant messaging, group chat, message board, message/news feed, and the like); and
- client data 340 storing data associated with the social networking platform, including, but is not limited to:
    - user profile 342 storing a user profile of the social networking user account associated with client device 104, including user account name, login credentials to the social networking platform, payment data (e.g., linked credit card information, credit or gift card balance, billing address, shipping address, etc.), custom parameters (e.g., age, location, hobbies, etc.) for the user, social network contacts, groups of contacts to which the user belongs, and identified trends and/or likes/dislikes of the user; and
    - user data 344 storing data authored, saved, liked, or chosen as favorites by the user of client device 104 in the social networking platform.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in FIGS. 2-3, respectively, are merely illustrative, and different configurations of the modules for implementing the functions described herein are possible in various embodiments.

Figure 4:
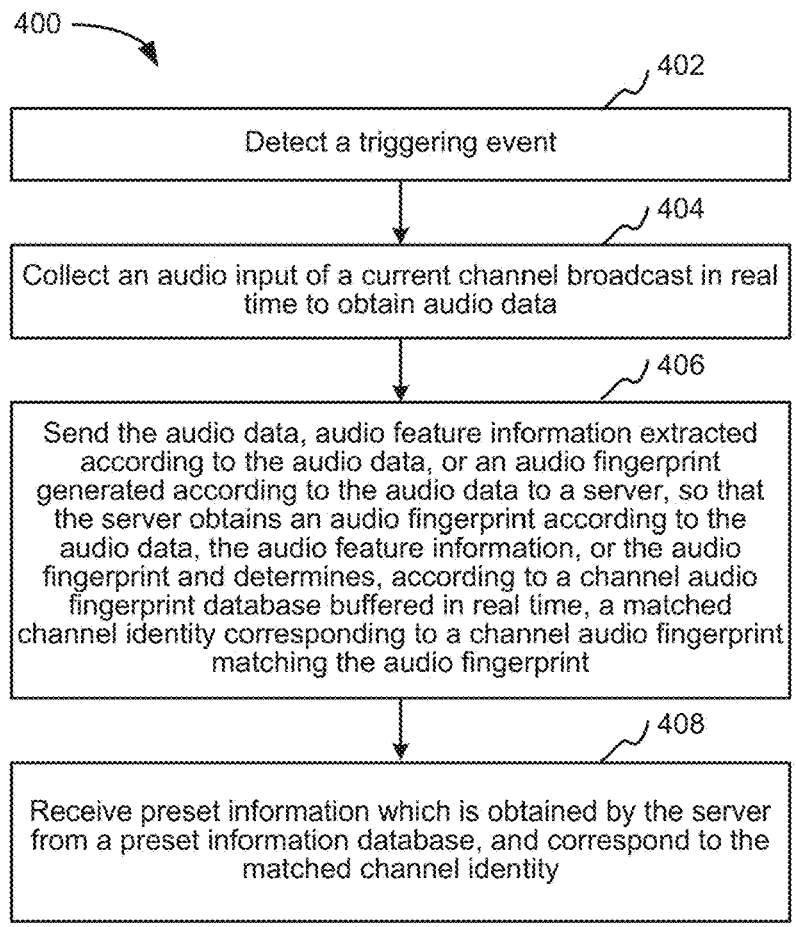
FIG. 4 is schematic flowchart illustrating a method for obtaining information in accordance with some embodiments.

FIG. 4 is schematic flowchart illustrating a method 400 for obtaining information in accordance with some embodiments. Method 400 includes detecting (402) a triggering event for capturing audio inputs. The triggering event refers to an event for triggering a operation, such as a pressing a button displayed on a touch display screen of the electronic device, or on the electronic device.

In some embodiments, the electronic device may sense a motion and the parameter(s) related to the motion of the electronic device, such as a motion acceleration, a motion direction, or a motion degree, using a motion sensor of the electronic device. When the sensed motion parameter meets a preset motion condition, it is determined that a triggering event is detected. The preset motion condition may be at least one of a motion acceleration exceeding an acceleration threshold, a change frequency of a motion direction exceeding a preset frequency threshold, and a motion degree exceeding a preset degree threshold. For example, a user may shake the electronic device with a certain strength and if the electronic device detects shake of the electronic device, a triggering event is detected. In some embodiments, when the electronic device detects a preset user fingerprint that has been recorded, a triggering event is detected. Alternatively, when the user detects a preset audio signal that has been recorded, a triggering event is detected. Alternatively, when the user detects a preset password that has been recorded, a triggering event is detected.

Method 400 further comprises collecting (404) an audio input of a current channel broadcast in real time to obtain audio data. A television or an external loudspeaker connected to the television is located within an audio input sensing range of the electronic device. The current channel may be a channel currently selected by a user. The television or a set top box connected to the television receives a satellite signal in real time, of the current channel, broadcast by a television relay satellite, and converts the satellite signal into a video-audio data flow. The television or a set top box may receive a video-audio data flow of the current channel in real time through a wired television channel or a network connection. A loudspeaker of the television or the external loudspeaker connected to the television broadcasts in real time, according to an audio data flow in the video-audio data flow of the current channel, a program sound of the channel currently selected by the user. In some embodiments, the program sound of the current channel broadcast in real time may be a program sound of a television channel. In some embodiments, the program sound is a program sound of a broadcasting station channel.

When a triggering event is detected, the electronic device collects an environment sound through an audio input collector of the electronic device, thereby collecting the program sound of the current channel broadcast by the television in real time. In some embodiments, collection of the sound of the current channel broadcast in real time in the environment may be started and timing is performed from a moment when a triggering event is detected. When timing reaches a preset time length, the collection ends, and then audio data within the preset time length is obtained. The audio data refers to collected audio data. The preset time length is preferably 5-15 seconds, and in this way, audio can be effectively recognized and an occupied storage space is relatively small. Certainly, the user may also set a customized time length. By using the preset time length, in subsequent processing, a server can conveniently perform accurate audio recognition to determine a matched channel identity. In an embodiment, the audio data is pulse-code modulation (PCM) audio data whose sampling frequency is 8 kHZ and which is quantized with 16 bits.

Method 400 further comprises sending (406) the audio data, audio feature information extracted according to the audio data, and/or an audio fingerprint generated according to the audio data to a server, so that the server obtains an audio fingerprint according to the audio data, the audio feature information, or the audio fingerprint, and determines, according to a channel audio fingerprint database buffered in real time, a matched channel identity corresponding to a channel audio fingerprint matching the audio fingerprint.

The audio fingerprint refers to a content-based compact digital signature which represents an important acoustic feature of a piece of audio data. The audio fingerprint requires perceptual similarity, and has basic characteristics such as differentiability, robustness, and granularity. The differentiability refers to that audio fingerprints generated according to different pieces of audio data are substantially different from each other, and audio fingerprints generated separately according to original data and distorted data of a same piece of audio data are slightly different from each other. The robustness refers to that audio data can still be recognized after going through various types of processing such as audio format conversion and channel noise interference. The granularity refers to that audio data of a relatively short time length (for example, 5 seconds to 10 seconds) can also be successfully recognized.

In some embodiments, the electronic device may send the audio data to the server through a communications interface of the electronic device, such as a network interface or a wireless mobile communications interface. The server is used to: after receiving the audio data sent by the electronic device, extract the audio feature information from the audio data, and generate the audio fingerprint according to the audio feature information. Such embodiments are applicable to scenarios in which the electronic device is limited in data processing performance and cannot perform further processing on the audio data, or performs further processing on the audio data at a high time cost.

In some embodiments, the electronic device may first perform feature extraction from the audio data to obtain the audio feature information, and send the audio feature information to the server through the communications interface of the electronic device. The server may be used to: after receiving the audio feature information, generate the audio fingerprint according to the audio feature information. The audio feature information refers to feature information obtained by performing feature extraction from the audio data, and the audio fingerprint refers to an audio fingerprint generated according to the audio data. Feature extraction from the audio data may be performed by adopting extraction according to a frequency and amplitude or by adopting linear predictive coding (LPC). Such embodiments are applicable to scenarios in which the electronic device has a strong data processing performance. In some examples, the electronic device extracts the audio feature information of a relatively small data amount from the audio data of a relatively large data amount and sends the audio feature information to the server. In this way, network resource consumption can be reduced to some extent, and power consumption of the electronic device can be reduced to some extent because the audio fingerprint is not directly generated.

In some embodiments, the electronic device may also locally generate the audio fingerprint according to the audio data. In some embodiments, the electronic device may first perform feature extraction from the audio data to obtain the audio feature information, generate the audio fingerprint according to the audio feature information, and sends the audio fingerprint to the server, so that the server can directly obtain the audio fingerprint for audio recognition and further determine the matched channel identity. Such embodiments are applicable to situations in which the electronic device has strong data processing performance. In some examples, the generated audio fingerprint does not affect the network resource consumption significantly.

In some embodiments, the server is used to receive in real time, through a satellite signal receiver, a satellite signal, of each channel, broadcast by a television relay satellite, and converts the satellite signal into a video-audio data flow. The server may receive a video-audio data flow of each channel in real time through a wired television channel or a network connection. The server is used to extract a channel audio data flow from the video-audio data flow, according to the channel audio data flow, channel audio feature information corresponding to each channel identity; generate a channel audio fingerprint corresponding to each channel identity according to the channel audio feature information corresponding to each channel identity; and buffer in real time a correspondence between a channel identity and a channel audio fingerprint in a channel audio fingerprint database. A technical means used by the server to extract the channel audio feature information matches with the technical means used by the electronic device to extract the audio feature information. The channel audio data flow refers to an audio data flow of a channel, the channel audio feature information refers to feature information obtained by performing feature extraction from an audio data flow of a channel, and the channel audio fingerprint refers to an audio fingerprint generated according to an audio data flow of a channel.

In some embodiments, the server is used to obtain in real time a channel audio data flow corresponding to each channel identity, and generate, according to the obtained channel audio data flow, a channel audio fingerprint corresponding to each channel identity, where the channel audio fingerprint includes a channel timestamp. The server is further used to cyclically buffer a correspondence between a channel audio fingerprint whose channel timestamp is within a preset time length away from a current time and a channel identity in a channel audio fingerprint database. Specific steps of implementing this function by the server are described in Step 802 to Step 814 of method 800 in the following application.

The server may be used to compare an audio fingerprint with a channel audio fingerprint of each channel currently buffered in the channel audio fingerprint database, determine a matched channel audio fingerprint, and obtain a channel identity corresponding to the matched channel audio fingerprint in the channel audio fingerprint database as the matched channel identity. The matched channel identity is an identity of a channel, of a program being broadcast in real time, determined by the server. In some embodiments, specific steps of implementing this function by the server are described in Step 902 to Step 906 of method 900 in the following application.

Method 400 further comprises receiving (408) preset information which is obtained by the server from a preset information database, and corresponds to the matched channel identity. The server is used to store the preset information database in advance. The preset information database stores a correspondence between a channel identity and preset information, so that the server can obtain, from the preset information database, the preset information corresponding to the matched channel identity according to the correspondence, and send the obtained preset information to the electronic device. The electronic device may display the preset information on a display screen of the electronic device after receiving the preset information.

In the information obtaining method, when a triggering event is detected, audio data is obtained by collecting an audio input of a current channel broadcast in real time by a device such as a television in an environment; and the audio data, audio feature information, or an audio fingerprint is sent to a server, so that the server obtains an audio fingerprint based on the audio data, the audio feature information, or the audio fingerprint, and further performs audio recognition to determine a matched channel identity. The matched channel identity is an identity of a channel, of a program being broadcast during audio collection, determined by the server. Received preset information is information related to the program being broadcast. In this way, information can be obtained by means of sound recognition. As long as audio collection is triggered on an electronic device, audio recognition may be performed through the server to obtain information related to a program being broadcast in a current channel, thereby improving information obtaining efficiency.

In some embodiments, audio fingerprint collection corresponds to collection time information, and Step 408 includes: receiving preset information which is obtained by the server from the preset information database, sent by the server, corresponds to the matched channel identity, and has a time attribute matching with the collection time information.

The collection time information is used to indicate time information during audio fingerprint collection. The collection time information may include: a local time which is obtained when the electronic device detects a triggering event and is sent to the server; a current system time of the server recorded by the server after the electronic device notifies the server when detecting a triggering event; a current system time of the server recorded by the server when the server receives the audio data, the audio feature information, or the audio fingerprint that is sent by the electronic device; a current system time of the server obtained by the server when obtaining the preset information from the preset information database; and/or a time obtained after the server modifies, according to a preset delay constant, a current system time of the server obtained by the server when obtaining the preset information from the preset information database, for example, subtracting the preset delay constant from the current system time of the server. The system time of the server is more accurate than a time sent by the electronic device, so that accuracy of obtained information is improved.

The preset information corresponding to the channel identity may be information related to a broadcast program in a channel, for example, shopping information, advertisement promotion information, announcement information, or news information. The server is used to store preset information corresponding to each channel identity in the preset information database. Each piece of preset information has a time attribute, for example, a start time mark or an end time mark; and the time attribute may indicate a correspondence of the preset information in a program broadcast in a current channel, so that the server can push different content for different programs of a same channel. For example, the preset information database may recognize and store a corresponding relationship between channel 1 and commodity information which serves as the preset information, and a time attribute of the commodity information is 19:00~19:30. Then when the matched channel identity is 1, and a time indicated by the collection time information is within 19:00~19:30, the shopping information is sent to the electronic device, and the electronic device receives and displays the commodity information.

In some embodiments, the information obtaining method further includes: displaying the preset information, receiving an operation instruction corresponding to the displayed preset information, and performing an operation matching with the operation instruction. The operation instruction includes at least one of an information collection instruction, a display closing instruction, an information sharing instruction, and a numerical value transfer instruction.

In some embodiments, the information obtaining method further includes: displaying the preset information, receiving a numerical value transfer instruction corresponding to the displayed preset information, and sending a numerical value transfer request carrying a transfer amount, a first numerical value account identity, and a second numerical value account identity to the server according to the numerical value transfer instruction, so that the server subtracts, according to the numerical value transfer request, the transfer amount from a first numerical value account corresponding to the first numerical value account identity, and adds, according to the numerical value transfer request, the transfer amount to a second numerical value account corresponding to the second numerical value account identity. The numerical value transfer request may be directly generated according to the numerical value transfer instruction and sent to the server; or a numerical value transfer application may be invoked according to the numerical value transfer instruction, and the numerical value transfer request is sent to the server through the numerical value transfer application.

In some embodiments, the numerical value transfer instruction may be a payment instruction. Then the numerical value transfer application is a payment application; the numerical value transfer request is a payment request; the transfer amount is a payment amount; the first numerical value account identity is a payment account identity, where the payment account identity may be at least one of two types: a user identity and a payment account, and the first numerical value account is a payment account; the second numerical value account identity is a payment receiving account identity, where the payment receiving account identity may be at least one of two types: a seller identity and a payment receiving account, and the second numerical value account is a payment receiving account; and the preset information may be commodity information.

Correspondingly, the step of sending a numerical value transfer request carrying a transfer amount, a first numerical value account identity, and a second numerical value account identity to the server according to the numerical value transfer instruction, so that the server subtracts, according to the numerical value transfer request, the transfer amount from a first numerical value account corresponding to the first numerical value account identity, and adds, according to the numerical value transfer request, the transfer amount to a second numerical value account corresponding to the second numerical value account identity includes: sending the payment request carrying the payment amount, the payment account identity, and the payment receiving account identity to the server according to the payment instruction, so that the server subtracts, according to the payment request, the payment amount from the payment account corresponding to the payment account identity, and adds, according to the payment request, the payment amount to the payment receiving account corresponding to the payment receiving account identity. The payment request may be generated directly according to the payment instruction and sent to the server; or a payment application may be invoked according to the payment instruction, and the payment request is sent to the server through the payment application.

In another embodiment, the numerical value transfer operation may further be an adjustment on a parameter, stored in the server, in a numerical value form, for example, statistics collection of data traffic. Then the first numerical value account may be a remaining traffic account, and the second numerical value account may be a used traffic account.

In some embodiments, the information obtaining method further includes: displaying the preset information, receiving an information collection instruction corresponding to the displayed preset information, and recording the preset information or an access path of the preset information in a collection list according to the information collection instruction. In a subsequent use, a user can quickly access the collected preset information using the collection list. In a subsequent use, a user can quickly access the collected preset information using the collection list.

In some embodiments, the information obtaining method further includes: displaying the preset information, receiving a display closing instruction corresponding to the displayed preset information, and closing, according to the display closing instruction, an interface for displaying the preset information. Closing an interface may be hiding the interface or deleting the interface.

In some embodiments, the information obtaining method further includes: displaying the preset information, receiving an information sharing instruction corresponding to the displayed preset information, and sending, according to the information sharing instruction, the preset information or the access path of the preset information to a terminal designated by the information sharing instruction. A network address of a designated terminal may be obtained according to the information sharing instruction, so as to directly send the preset information or the access path of the preset information to the designated terminal without participation of the server.

In some embodiments, the information obtaining method further includes: displaying the preset information, receiving an information sharing instruction corresponding to the displayed preset information, and sending, according to the information sharing instruction, an information sharing request carrying the preset information or the access path of the preset information to the server, so that the server sends, according to the information sharing request, the preset information or the access path of the preset information to a terminal corresponding to a target user identity carried in the information sharing request. The target user identity is a user identity of a user designated to receive shared information, and the user identity may be in a friend relationship with a user identity initiating the information sharing instruction, where the friend relationship is a digitalized virtual social relationship.

Figure 5:
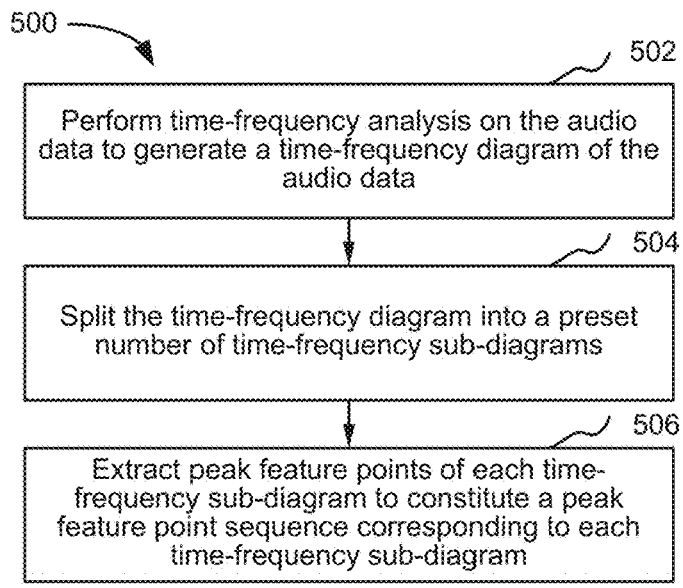
FIG. 5 is a schematic flowchart illustrating a method of extracting audio feature information according to audio data in accordance with some embodiments.

FIG. 5 is a schematic flowchart illustrating a method 500 of extracting audio feature information according to audio data in accordance with some embodiments. Method 500 comprises performing (502) time-frequency analysis on the audio data to generate a time-frequency diagram of the audio data.

Joint time-frequency analysis (JTFA) is briefly called time-frequency analysis. As a powerful tool for analyzing a time-varying non-stationary signal and an emerging signal processing method, the time-frequency analysis becomes a focus of signal processing studies in modern times and attracts increasing attention in recent years. The time-frequency analysis method provides information about joint distribution in a time domain and a frequency domain, and clearly describes a relationship in which a signal frequency varies with time.

The audio data may be first preprocessed to obtain PCM audio data whose sampling frequency is 8 kHZ and which is quantized with 16 bits. Framing processing is performed on the audio data x(t) in a one-dimensional time domain to obtain an audio signal of each frame of the audio data, and the framing processing may be performed with a window length of 128 ms and a frame stack of 16 ms as parameters. Short-time Fourier transform (STFT) is performed on the audio signal of each frame using a formula (1) to obtain a frequency spectrum x(f) of the audio signal of each frame of the audio data.

$$X(f) = \sum_{t=0}^{T-1} w(t)x(t)e^{-\frac{j2\pi t f}{T}} \qquad (1)$$

where T is a Fourier transform point quantity; t is an independent variable of a time dimension; w(t) is a window function, which may be a common window function such as a Hamming window function, a Hann window function, or a Gaussian window function, where the Hamming window function is shown in a formula (2); and f is a frequency value.

$$w(t) = 0.54 - 0.46 \cos\left(\frac{2t\pi}{T-1}\right), 0 \le t \le T-1 \qquad (2)$$

An amplitude spectrum corresponding to the frequency spectrum of the audio signal of each frame is extracted, and an amplitude spectrum of each frame is stacked in a time order, so as to obtain a time-frequency diagram S(t, f) of the audio data, where the time-frequency diagram may embody information of two dimensions of time and frequency.

Method 500 further comprises splitting (504) the time-frequency diagram into a preset number of time-frequency sub-diagrams.

The time-frequency diagram is split into a preset number of time-frequency sub-diagrams in a time modulo manner, and each time-frequency sub-diagram corresponds to a phase channel. A value of the preset number may be determined according to an actual situation, and may be determined according to an audio parameter of the audio data, for example, determined according to a factor of the audio data, such as a signal to noise ratio.

If the preset number is represented by a positive integer M, Step 504 includes: using frequency values obtained when the independent variable of the time dimension is 0, M, 2M, . . . in a value range of the independent variable of the time dimension in the time-frequency diagram of the audio data as a first time-frequency sub-diagram corresponding to a first phase channel, using frequency values obtained when the independent variable of the time dimension is 1, M+1, 2M+1, . . . in the value range of the independent variable of the time dimension in the time-frequency diagram of the audio data as a second time-frequency sub-diagram corresponding to a second phase channel, and performing the similar operation until an $M^{th}$ time-frequency sub-diagram corresponding to an $M^{th}$ phase channel is obtained.

Method 500 further comprises extracting (506) peak feature points of each time-frequency sub-diagram to constitute a peak feature point sequence corresponding to each time-frequency sub-diagram. In some embodiments, the peak feature points are extracted from each time-frequency sub-diagram of the audio data, and the extracted peak feature points need to meet a condition that an energy value reaches the maximum in a preset rectangular neighborhood. The peak feature points corresponding to each time-frequency sub-diagram are ranked as a sequence in an ascending order of time.

After the peak feature point sequence is generated, the electronic device may separately compress time data and frequency data in the peak feature point sequence of each time-frequency sub-diagram, and send the compressed time data and the compressed frequency data to the server, so that the server separately decompresses the received compressed data of the time data and the received compressed data of the frequency data to obtain the peak feature point sequence of each time-frequency sub-diagram of the audio data. For the time data, because what is collected is an audio input within a preset time length, the time data is limited in a value range and is ranked in an ascending order of time, and multiple time values may be encoded into a data structure of 32 bits and compressed. For the frequency data, because a value range of the frequency data is [0, T/2+1], where T=1024, each frequency value may be represented only by 9 bits.

The server is used to separately decompress the received compressed data of the time data and the received compressed data of the frequency data in a preset decryption manner matching with an encryption manner of the electronic device, so as to obtain the peak feature point sequence of each time-frequency sub-diagram of the audio data. The peak feature point sequence is used by the server to generate the audio fingerprint. The server implements a function of generating the audio fingerprint according to the peak feature point sequence of each time-frequency sub-diagram of the audio data, which is implemented in Step 11) to Step 12) in the following information pushing method.

Figure 6:
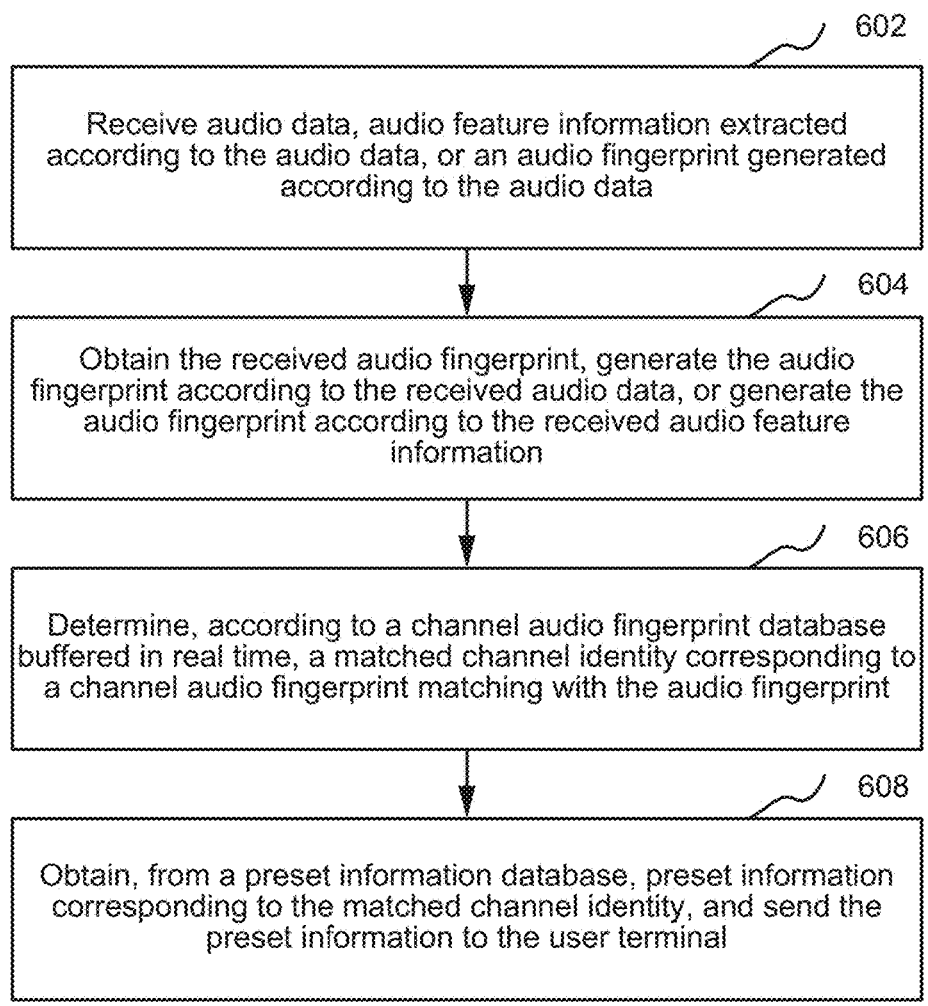
FIG. 6 is schematic flowchart of an information pushing method in accordance with some embodiments.

FIG. 6 is schematic flowchart of an information pushing method 600 in accordance with some embodiments. This embodiment is described using an example in which method 600 is applied to the server in the foregoing information interaction system. The information pushing method corresponds to the information obtaining method in the foregoing embodiments. Method 600 comprises receiving (602) audio data, audio feature information extracted according to the audio data, or an audio fingerprint generated according to the audio data.

In some embodiments, a program sound of a current channel broadcast in real time may be a program sound of a television channel. In some embodiments, the program sound may further be a program sound of a broadcasting station channel. An electronic device may be used to detect a triggering event by detecting a clicking operation of a user on a triggering button displayed on a touch display screen of the electronic device, or a pressing operation on a shortcut button preset on the electronic device, or by sensing, by a motion sensor of the electronic device, whether a motion parameter of the electronic device meets a preset motion condition. When a triggering event is detected, the electronic device collects an environment sound through an audio input collector of the electronic device, thereby collecting the program sound of the current channel broadcast by a television in real time.

The audio data may be collected according to a preset time length, for example, 5-15 seconds. The preset time length is used so that audio can be effectively recognized and an occupied storage space is relatively small. Certainly, the user may also set a time length for audio collection, but using the preset time length, in subsequent processing, a server can conveniently perform accurate audio recognition to determine a matched channel identity. In an embodiment, the audio data is PCM audio data whose sampling frequency is 8 kHZ and which is quantized with 16 bits.

Method 600 further comprises obtaining (604) the received audio fingerprint, generate the audio fingerprint according to the received audio data, or generate the audio fingerprint according to the received audio feature information. When the electronic device sends the audio fingerprint, the server directly obtains the audio fingerprint sent by the electronic device. When the electronic device sends the audio feature information, the server generates the audio fingerprint according to the audio feature information. When the electronic device sends the audio data, the server may first perform feature extraction from the audio data to obtain the audio feature information, and then generate the audio fingerprint according to the audio feature information.

Method 600 further comprises determining (606), according to a channel audio fingerprint database buffered in real time, a matched channel identity corresponding to a channel audio fingerprint matching with the audio fingerprint.

The server receives, e.g., in real time, through a satellite signal receiver connected to the server, a satellite signal of each channel, broadcast by a television relay satellite. The server converts the satellite signal into a video-audio data flow. The server may receive a video-audio data flow of each channel in real time through a wired television channel or a network connection. The server extracts a channel audio data flow from the video-audio data flow, generates, according to the channel audio data flow, channel audio feature information corresponding to each channel identity, generates a channel audio fingerprint corresponding to each channel identity according to the channel audio feature information corresponding to each channel identity, and buffers in real time a correspondence between a channel identity and a channel audio fingerprint in a channel audio fingerprint database. A technical means used by the server to extract the channel audio feature information matches with the foregoing technical means used by the electronic device to extract the audio feature information. The channel audio data flow refers to an audio data flow of a channel, the channel audio feature information refers to feature information obtained by performing feature extraction from an audio data flow of a channel, and the channel audio fingerprint refers to an audio fingerprint generated according to an audio data flow of a channel.

The server may compare an audio fingerprint with a channel audio fingerprint of each channel currently buffered in the channel audio fingerprint database, determine a matched channel audio fingerprint, and obtain a channel identity corresponding to the matched channel audio fingerprint in the channel audio fingerprint database as the matched channel identity. The matched channel identity is an identity of a channel, of a program being broadcast during audio collection, determined by the server.

Method 600 further comprises obtaining (608), from a preset information database, preset information corresponding to the matched channel identity, and sending the preset information to the electronic device. The server stores the preset information database in advance. The preset information database stores a correspondence between a channel identity and preset information, so that the server can obtain, from the preset information database, the preset information corresponding to the matched channel identity according to the correspondence, and send the obtained preset information to the electronic device so the electronic device receives the preset information.

In the information pushing method, one of the audio data, the audio feature information, and the audio fingerprint that are collected by the electronic device is received, so as to obtain the audio fingerprint. The matched channel identity corresponding to the channel audio fingerprint matching with the audio fingerprint is determined using the channel audio fingerprint database buffered in real time. The matched channel identity is an identity of a channel, of a program being broadcast during audio collection, determined by the server. The preset information which is sent by the server to the electronic device and corresponds to the matched channel identity is information related to the program being broadcast. Therefore, when a device in an environment where a user is located, such as a television, broadcasts real-time sound information, remote service support is provided so that the user can efficiently obtain information related to the broadcast real-time sound information, so as to efficiently push information needed by the electronic device to the electronic device.

In an embodiment, audio fingerprint collection corresponds to collection time information, and Step 608 includes: obtaining, from the preset information database, the preset information which corresponds to the matched channel identity and has a time attribute matching with the collection time information, and sending the preset information to the electronic device.

In an embodiment, the information pushing method further includes: receiving a numerical value transfer request which carries a transfer amount, a first numerical value account identity, and a second numerical value account identity and is sent by the electronic device in response to the preset information; and subtracting, according to the numerical value transfer request, the transfer amount from a first numerical value account corresponding to the first numerical value account identity, and adding, according to the numerical value transfer request, the transfer amount to a second numerical value account corresponding to the second numerical value account identity.

Correspondingly, the step of receiving a numerical value transfer request which carries a transfer amount, a first numerical value account identity, and a second numerical value account identity and is sent by the electronic device in response to the preset information includes: receiving the payment request which carries the payment amount, the payment account identity, and the payment receiving account identity and is sent by the electronic device in response to the commodity information. The step of subtracting, according to the numerical value transfer request, the transfer amount from a first numerical value account corresponding to the first numerical value account identity, and adding, according to the numerical value transfer request, the transfer amount to a second numerical value account corresponding to the second numerical value account identity includes: subtracting, according to the payment request, the payment amount from the payment account corresponding to the payment account identity, and adding, according to the payment request, the payment amount to the payment receiving account corresponding to the payment receiving account identity.

In another embodiment, the numerical value transfer operation may further be an adjustment on a parameter, stored in the server, in a numerical value form, for example, statistics collection of data traffic. Then the first numerical value account may be a remaining traffic account, and the second numerical value account may be a used traffic account.

In some embodiments, the information pushing method further includes: receiving an information sharing request which carries the preset information or an access path of the preset information and is sent by the electronic device in response to the preset information; and sending, according to the information sharing request, the preset information or the access path of the preset information to a terminal corresponding to a target user identity carried in the information sharing request. The target user identity is a user identity of a user designated to receive shared information, and the user identity may be in a friend relationship with a user identity initiating an information sharing instruction, where the friend relationship is a digitalized virtual social relationship.

In an embodiment, the audio feature information is a peak feature point sequence corresponding to each time-frequency sub-diagram of the audio data. In some embodiments, the electronic device may generate, using Step 502 to Step 506, the peak feature point sequence corresponding to each time-frequency sub-diagram of the audio data; and send the generated peak feature point sequence to the server. In an embodiment, the electronic device is used to separately compress time data and frequency data in the peak feature point sequence of each time-frequency sub-diagram, and send the compressed time data and the compressed frequency data to the server. The server may separately decompress the received compressed data of the time data and the received compressed data of the frequency data in a preset decryption manner matching with an encryption manner of the electronic device, so as to obtain the peak feature point sequence of each time-frequency sub-diagram of the audio data.

In an embodiment, the step of generating the audio fingerprint according to the received audio feature information in Step 604 includes the following Step 11) and Step 12).

Step 11): Perform pairing processing on each peak feature point in the peak feature point sequence of each time-frequency sub-diagram of the audio data to obtain a peak feature point pair corresponding to each time-frequency sub-diagram of the audio data.

In some embodiments, $S''(t_k,f_k)$ defined to represent any peak feature point in an $n^{th}$ phase channel or an $n^{th}$ time-frequency sub-diagram, where n represents a sequence number of a phase channel or a sequence number of a time-frequency sub-diagram, and $0<n\leq M$; M is the foregoing preset number; k represents a sequence number of the peak feature point in a peak feature point sequence n corresponding to the $n^{th}$ phase channel, and k is a positive integer; $t_k$ represents a time when the peak feature point appears in the $n^{th}$ time-frequency sub-diagram; and $f_k$ represents a frequency value of the peak feature point.

A process in which pairing processing is performed on each peak feature point in the peak feature point sequence of each time-frequency sub-diagram may include the following steps:

(1) In a time-frequency sub-diagram one to one corresponding to each phase channel, select a rectangular target area using each peak feature point in a peak feature point sequence of each phase channel as an anchor point, where for any peak feature point $S''(t_k,f_k)$ in any time-frequency sub-diagram, the rectangular target area meets the following condition:

$$t_{start} \leq t_k \leq t_{end} \text{ and } f_{start} \leq f_k \leq f_{end}$$

where $t_{start}$ represents a start time of a rectangular target area selected using a peak feature point $S''(t_k,f_k)$ as an anchor point, $t_{end}$ represents an end time of the rectangular target area selected using the peak feature point $S''(t_k,f_k)$ as an anchor point, $f_{start}$ represents a minimum frequency of the rectangular target area selected using the peak feature point $S''(t_k,f_k)$ as an anchor point, and $f_{end}$ represents a maximum frequency of the rectangular target area selected using the peak feature point $S''(t_k,f_k)$ as an anchor point.

(2) Select a peak feature point other than the anchor point in the rectangular target area to be paired with the anchor point, where the anchor point and the peak feature point paired with the anchor point constitute the peak feature point pair. A principle for selecting the peak feature point paired with the anchor point may include: selecting a peak feature point whose appearance time has a minimum time difference from an appearance time of the anchor point, or selecting a peak feature point with a maximum energy value other than the anchor point.

By performing steps (1) and (2), for any peak feature point $S''(t_k,f_k)$, a paired peak feature point $S''(t_b,f_b)$ can be obtained, where n represents a sequence number of a phase channel or a sequence number of a time-frequency sub-diagram, and $0<n\leq M$; b represents a sequence number of the paired peak feature point in a peak feature point sequence n, and b is a positive integer; $t_b$ represents a time when the paired peak feature point $S''(t_b,f_b)$ appears in the $n^{th}$ time-frequency sub-diagram; and $f_b$ represents a frequency value of the paired peak feature point. In this embodiment, a four-tuple $(t_k,f_k,\Delta f_k,\Delta t_k)_n$ is defined to represent any peak feature point pair in a peak feature point pair sequence of any phase channel, where n represents a sequence number of a phase channel or a sequence number of a time-frequency sub-diagram; $\Delta t_k$ represents a time difference between two peak feature points in a peak feature point pair, and $\Delta t_k = t_b - t_k$; and $\Delta f_k$ represents a frequency difference between two peak feature points in a peak feature point pair, and $\Delta f_k = f_b - f_k$.

Step 12): Perform a Hash operation according to a peak feature point pair corresponding to each time-frequency sub-diagram of the audio data to obtain the audio fingerprint.

As described in the foregoing, the four-tuple $(t_k,f_k,\Delta f_k,\Delta t_k)_n$ is used to represent any peak feature point pair in a peak feature point pair sequence of any phase channel. Parameters in the four-tuple may be understood as follows: $(f_k, \Delta f_k, \Delta t_k)$ represents a feature part of a peak feature point pair, and $t_k$ represents a time when $(f_k, \Delta f_k, \Delta t_k)$ appears and represents a collection timestamp. In this step, the Hash operation may be performed on $(f_k, \Delta f_k, \Delta t_k)$, $(f_k, \Delta f_k, \Delta t_k)$ is represented using a Hash code with a fixed bit quantity, as follows: $hashcode_k = H(f_k, \Delta f_k, \Delta t_k)$. Through the calculation in this step, any peak feature point pair in a peak feature point pair sequence of any phase channel may be represented by $(t_k, hashcode_k)_n$, where n represents a sequence number of a phase channel or a sequence number of a time-frequency sub-diagram, $t_k$ represents a time when $hashcode_k$ appears and $(t_k, hashcode_k)_n$ is an audio fingerprint and may represent a peak feature point pair. An audio fingerprint is represented by a collection timestamp and a Hash value.

Through Step 11) and Step 12), in M peak feature point pair sequences, each peak feature point pair in each peak feature point pair sequence may be represented by an audio fingerprint, each peak feature point pair sequence corresponds to an audio fingerprint sequence, and M peak feature point pair sequences correspond to M audio fingerprint sequences. A set formed by M audio fingerprint sequences can embody an acoustic feature of audio data; therefore, audio recognition can be performed accordingly to determine the matched channel identity.

Figure 7:
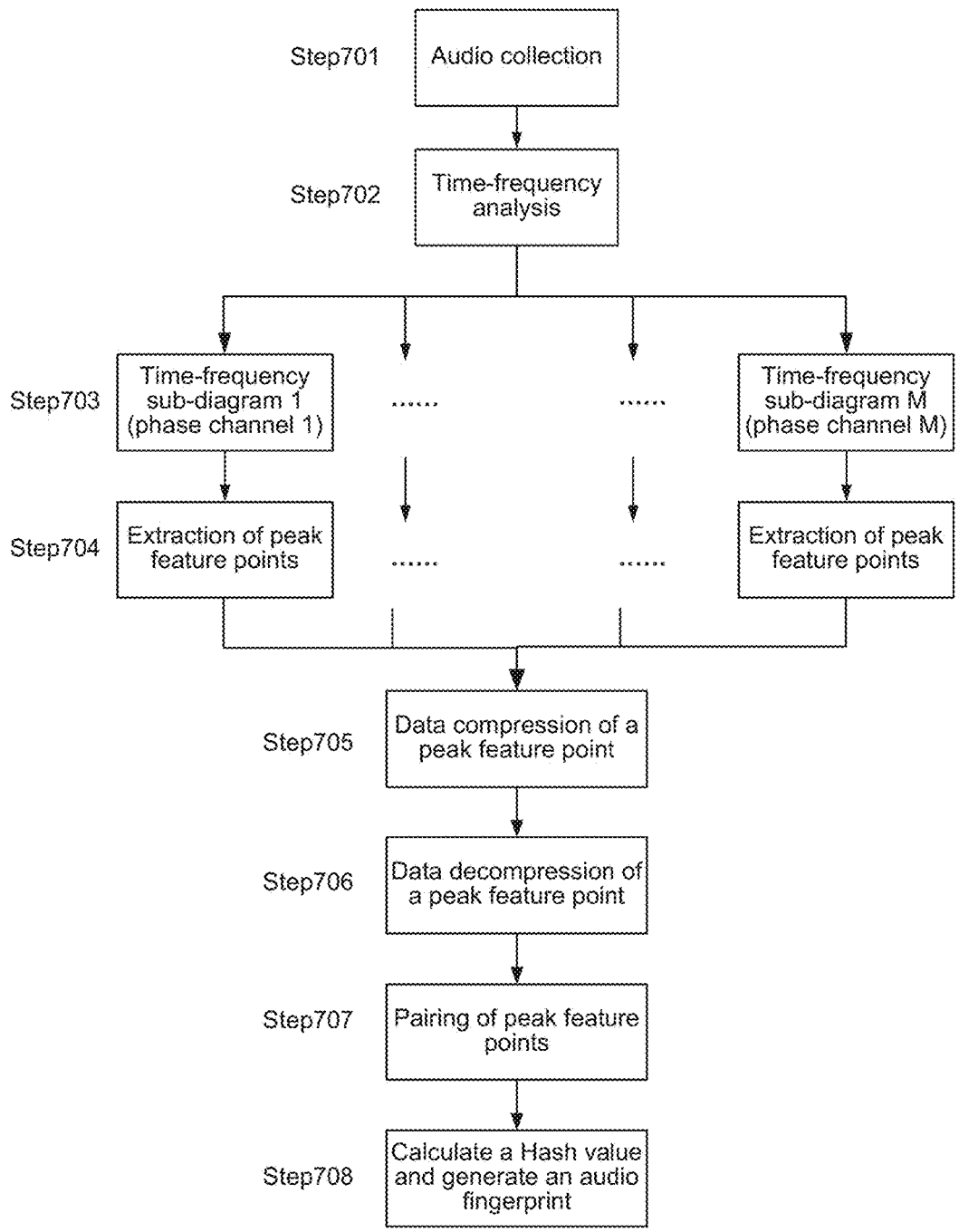
FIG. 7 is a schematic diagram of a process from audio collection by an electronic device to audio fingerprint extraction by a server in accordance with some embodiments.

FIG. 7 is a schematic diagram of a process from audio collection by an electronic device to audio fingerprint extraction by a server in accordance with some embodiments. Step 701 to Step 705 are completed by an electronic device, and Step 706 to Step 708 are completed by a server. In Step 701, an electronic device collects an audio input of a current channel broadcast in real time in an environment to obtain audio data. Step 702 to Step 704 respectively correspond to Step 502 to Step 506, in which the electronic device extracts audio feature information according to audio data. In Step 705, the electronic device separately compresses time data and frequency data in a peak feature point sequence of each time-frequency sub-diagram, and sends the compressed time data and the compressed frequency data to a server. In Step 706, the server separately decompresses the received compressed data of the time data and the received compressed data of the frequency data to obtain the peak feature point sequence of each time-frequency sub-diagram of the audio data. Step 707 to Step 708 respectively correspond to Step 11) to Step 12), in which the server generates an audio fingerprint according to the received audio feature information.

Figure 8:
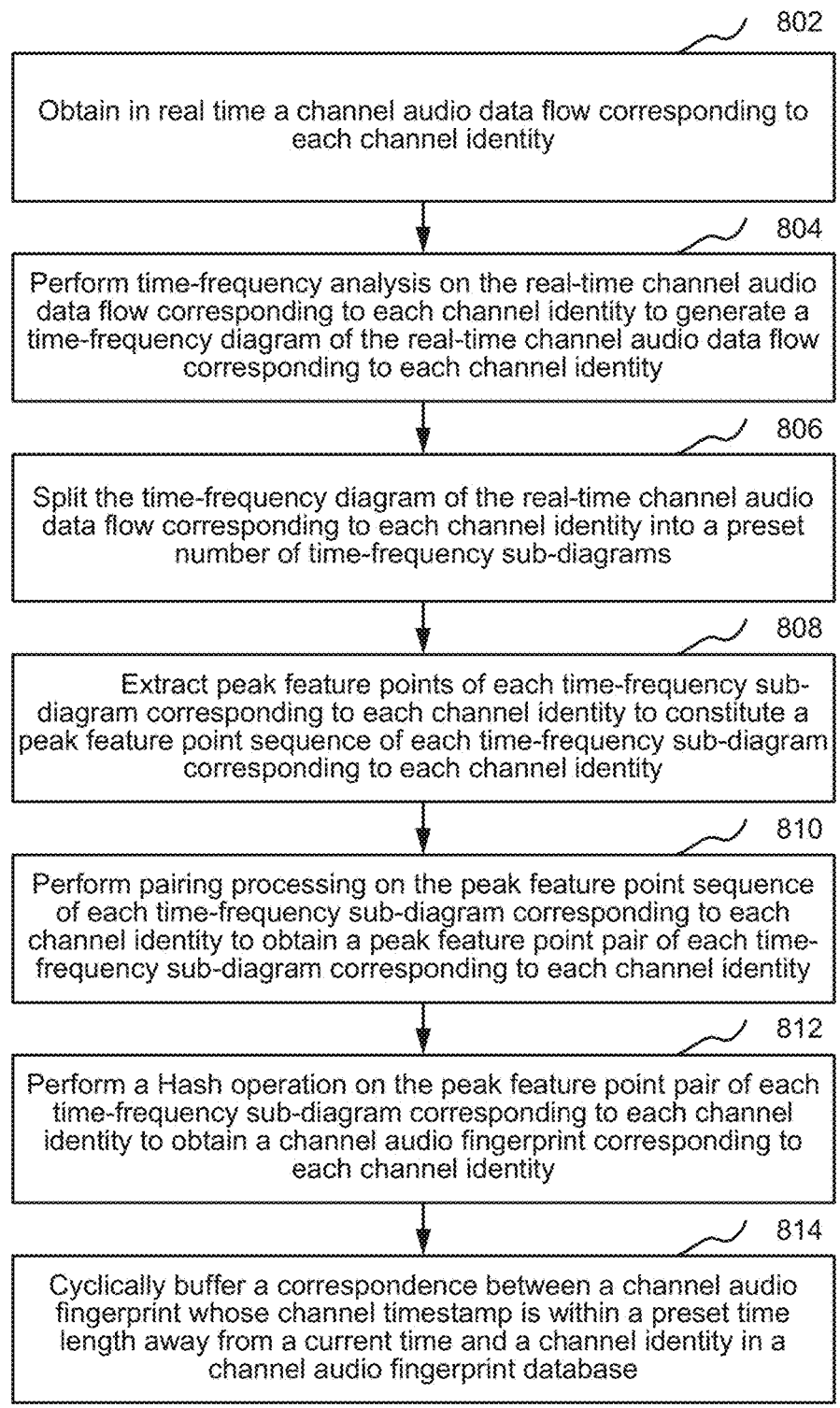
FIG. 8 is a schematic flowchart of steps of buffering a channel audio fingerprint database in real time in accordance with some embodiments.

FIG. 8 is a schematic flowchart of steps of buffering a channel audio fingerprint database in real time in accordance with some embodiments. Method 800 comprises obtaining (802) in real time a channel audio data flow corresponding to each channel identity. A server is used to receive in real time, through a satellite signal receiver, a satellite signal, of each channel, broadcast by a television relay satellite, and convert the satellite signal into a video-audio data flow; or receive a video-audio data flow of each channel in real time through a wired television channel or a network connection. Then, the server is used to extract, from the video-audio data flow, the channel audio data flow corresponding to each channel identity.

Method 800 further comprises performing (804) time-frequency analysis on the real-time channel audio data flow corresponding to each channel identity to generate a time-frequency diagram of the real-time channel audio data flow corresponding to each channel identity.

The server may be used to perform preprocessing in real time on the obtained channel audio data flow corresponding to each channel identity, and down-sample the channel audio data flow as a PCM channel audio data flow whose frequency is 8 kHZ and which is quantized with 16 bits. Framing processing is performed on the channel audio data flow in a one-dimensional time domain to obtain an audio signal flow of each frame. In some embodiments, the framing processing may be performed with a window length of 128 ms and a frame stack of 16 ms as parameters. STFT is performed on an audio signal flow of each frame to obtain a frequency spectrum of the audio signal flow of each frame.

The server is used to extract an amplitude spectrum corresponding to the frequency spectrum of the audio signal flow of each frame, and stack an amplitude spectrum of each frame in a time order, so as to obtain the time-frequency diagram of the real-time channel audio data flow corresponding to each channel identity, where the time-frequency diagram may embody information of two dimensions of time and frequency.

Method 800 further comprises splitting (806) the time-frequency diagram of the real-time channel audio data flow corresponding to each channel identity into a preset number of time-frequency sub-diagrams. The time-frequency diagram is split into a preset number of time-frequency sub-diagrams in a time modulo manner, and each time-frequency sub-diagram corresponds to a phase channel. In some embodiments, the preset number is represented by a positive integer M, and then frequency values obtained when the independent variable of the time dimension is 0, M, 2M, . . . in the time-frequency diagram of the real-time channel audio data flow corresponding to each channel identity are used as a first time-frequency sub-diagram corresponding to a first phase channel, frequency values obtained when the independent variable of the time dimension is 1, M+1, 2M+1, . . . in the time-frequency diagram of the audio data are used as a second time-frequency sub-diagram corresponding to a second phase channel, and the similar operation is performed until an $M^{th}$ time-frequency sub-diagram corresponding to an $M^{th}$ phase channel is obtained.

Method 800 further comprises extracting (808) peak feature points of each time-frequency sub-diagram corresponding to each channel identity to constitute a peak feature point sequence of each time-frequency sub-diagram corresponding to each channel identity. In some embodiments, the server is used to extract peak feature points from each time-frequency sub-diagram corresponding to each channel identity, where the extracted peak feature points need to meet a condition that an energy value reaches the maximum in a preset rectangular neighborhood. The peak feature points corresponding to each time-frequency sub-diagram corresponding to each channel identity are ranked as a sequence in an ascending order of time.

Method 800 further comprises performing (810) pairing processing on the peak feature point sequence of each time-frequency sub-diagram corresponding to each channel identity to obtain a peak feature point pair of each time-frequency sub-diagram corresponding to each channel identity.

With reference to Step 11), $S'^N(t'_K, f'_K)$ is defined to represent any peak feature point in an $N^{th}$ phase channel or an $N^{th}$ time-frequency sub-diagram that corresponds to each channel identity, where N represents a sequence number of a phase channel or a sequence number of a time-frequency sub-diagram, and $0 < N \le M$; M is the foregoing preset number; K represents a sequence number of the peak feature point in a peak feature point sequence N corresponding to the $N^{th}$ phase channel, and K is a positive integer; $t'_K$ represents a time when the peak feature point appears in the $N^{th}$ time-frequency sub-diagram; and $f'_K$ represents a frequency value of the peak feature point.

Through pairing, a paired peak feature point $S'^N(t_B, f_B)$ may be obtained for $S'^N(t_B, f_B)$, where N represents a sequence number of a phase channel or a sequence number of a time-frequency sub-diagram, and $0 < N \le M$; B represents a sequence number of the paired peak feature point in a peak feature point sequence N, and B is a positive integer; $t_B$ represents a time when the paired peak feature point $S'^N(t_B, f_B)$ appears in the $N^{th}$ time-frequency sub-diagram; and $f_B$ represents a frequency value of the paired peak feature point.

The peak feature point pair of each time-frequency sub-diagram corresponding to each channel identity may be represented by a four-tuple $(t'_K, f'_K, \Delta f'_K, \Delta t'_K)_N$, where N represents a sequence number of a phase channel or a sequence number of a time-frequency sub-diagram; $\Delta t'_K$ represents a time difference between two peak feature points in a peak feature point pair, and $\Delta t'_K = t'_B - t'_K$, and $\Delta f'_K$ represents a frequency difference between two peak feature points in a peak feature point pair, and $\Delta f'_K = f'_B - f'_K$.

Method 800 further comprises performing (812) a Hash operation on the peak feature point pair of each time-frequency sub-diagram corresponding to each channel identity to obtain a channel audio fingerprint corresponding to each channel identity.

As described in the foregoing, the four-tuple $(t'_K, f'_K, \Delta f'_K, \Delta t'_K)_N$ is used to represent any peak feature point pair in a peak feature point pair sequence of any phase channel. Parameters in the four-tuple may be understood as follows: $(f'_K, \Delta f'_K, \Delta t'_K)$ represents a feature part of a peak feature point pair, and $t'_K$ represents a time when $(f'_K, \Delta f'_K, \Delta t'_K)$ appears and represents a channel timestamp. In this step, the Hash operation may be performed on $(f'_K, \Delta f'_K, \Delta t'_K)$, and $(f'_K, \Delta f'_K, \Delta t'_K)$ is represented using a Hash code with a fixed bit quantity as follows: $hascode_K = H(f'_K, \Delta f'_K, \Delta t'_K)$. Through the calculation in this step, any peak feature point pair in a peak feature point pair sequence of any phase channel may be represented by $(t_K, hashcode_K)_N$, where N represents a sequence number of a phase channel or a sequence number of a time-frequency sub-diagram, $t'_K$ represents a time when $hashcode_K$ appears, and $(t_K, hashcode_K)_N$ is an audio fingerprint and may represent a peak feature point pair. A channel audio fingerprint may be represented by a channel timestamp and a Hash value.

Through this step, in M peak feature point pair sequences, each peak feature point pair in each peak feature point pair sequence may be represented by a channel audio fingerprint, each peak feature point pair sequence corresponds to a channel audio fingerprint sequence, and M peak feature point pair sequences correspond to M channel audio fingerprint sequences. In Step 804 to Step 812, the channel audio fingerprint corresponding to each channel identity is generated according to the obtained channel audio data flow.

Method 800 further comprises buffering (814) cyclically a correspondence between a channel audio fingerprint whose channel timestamp is within a preset time length away from a current time and a channel identity in a channel audio fingerprint database.

If the channel audio fingerprint database needs to buffer channel audio fingerprints of Y satellite television channels, a channel audio fingerprint of a preset time length $T_{pre}$ needs to be cyclically buffered for each channel. In some embodiments, assume that the current time is $T_{now}$, a channel audio fingerprint whose channel timestamp range is $[T_{now}-T_{pre}, T_{now}]$ needs to be buffered in the channel audio fingerprint database. The preset time length $T_{pre}$ is a life cycle of a channel audio fingerprint in the channel audio fingerprint database, and selection of the preset time length $T_{pre}$ needs to ensure that after the audio fingerprint is obtained, a corresponding channel audio fingerprint can be found in the channel audio fingerprint database to perform matching. In consideration that a user has different ways to watch a television program, there may be a delay caused by a digital set top box or a delay that exists when live broadcast of a television program is watched through a network, and the preset time length $T_{pre}$ may be selected from 1-10 minutes. With progression of time, new channel audio fingerprints are constantly generated and are buffered in the channel audio fingerprint database, and correspondingly a buffered channel audio fingerprint whose channel timestamp exceeds the preset time length $T_{pre}$ away from the current time is deleted from the channel audio fingerprint database.

Channel audio fingerprints buffered at the current time $T_{now}$ in the channel audio fingerprint database are shown in Table 1:

TABLE 1

| Channel identity | Buffered channel audio fingerprints whose channel timestamp is $[T_{now}-T_{pre}, T_{now}]$ |
|---|---|
| Channel 1 | $(t_1^1, hashcode_1^1), (t_2^1, hashcode_2^1), \ldots, (t_{l_1}^1, hashcode_{l_1}^1)$, |
| Channel 2 | $(t_1^2, hashcode_1^2), (t_2^2, hashcode_2^2), \ldots, (t_{l_2}^2, hashcode_{l_2}^2)$, |
| ... | |
| Channel y | $(t_1^y, hashcode_1^y), (t_2^y, hashcode_2^y), \ldots, (t_{l_y}^y, hashcode_{l_y}^y)$, |
| ... | |
| Channel Y | $(t_1^Y, hashcode_1^Y), (t_2^Y, hashcode_2^Y), \ldots, (t_{l_Y}^Y, hashcode_{l_Y}^Y)$, |

In Table 1, $l_y$ represents the number of channel audio fingerprints currently buffered in the channel audio fingerprint database for the channel y, and $t_{l_y}^y$ represents a channel timestamp of the $l_y^{th}$ channel audio fingerprint of the channel y at a current time. Channel audio fingerprints corresponding to each channel identity are ranked at an ascending order according to channel timestamps of the channel audio fingerprints, and the channel timestamps are kept within $[T_{now}-T_{pre}, T_{now}]$ and are represented by a formula as follows:

$$T_{now}-T_{Pre} \leq t_1^y \leq t_2^y \leq \ldots \leq t_{l_y}^y \leq T_{now}, \text{ where } y=1, 2, \ldots, Y$$

To improve efficiency of searching for a channel audio fingerprint in the channel audio fingerprint database, an index is created for channel audio fingerprints corresponding to each channel identity in an ascending order of Hash values.

TABLE 2

| ... | | ... | |
|---|---|---|---|
| Channel y | $hashcode_1^y$ | | $t_1^y$ |
| | $hashcode_2^y$ | | $t_2^y$ |
| | ... | | ... |
| | $hashcode_{l_y}^y$ | | $t_{l_y}^y$ |
| ... | | ... | |

In Table 2, $hashcode_1^y \leq hashcode_2^y \leq \ldots \leq hashcode_{l_y}^y$.

In this embodiment, in Step 802 to Step 814, a correspondence between a channel audio fingerprint whose channel timestamp is within a preset time length away from a current time and a channel identity is cyclically buffered in a channel audio fingerprint database. In this way, a relatively small storage space may be used, and it is ensured that the buffer is updated in real time, thereby ensuring that preset information which is needed by an electronic device and matches with an audio input broadcast in a current channel is provided to an electronic device in real time.

Figure 9:
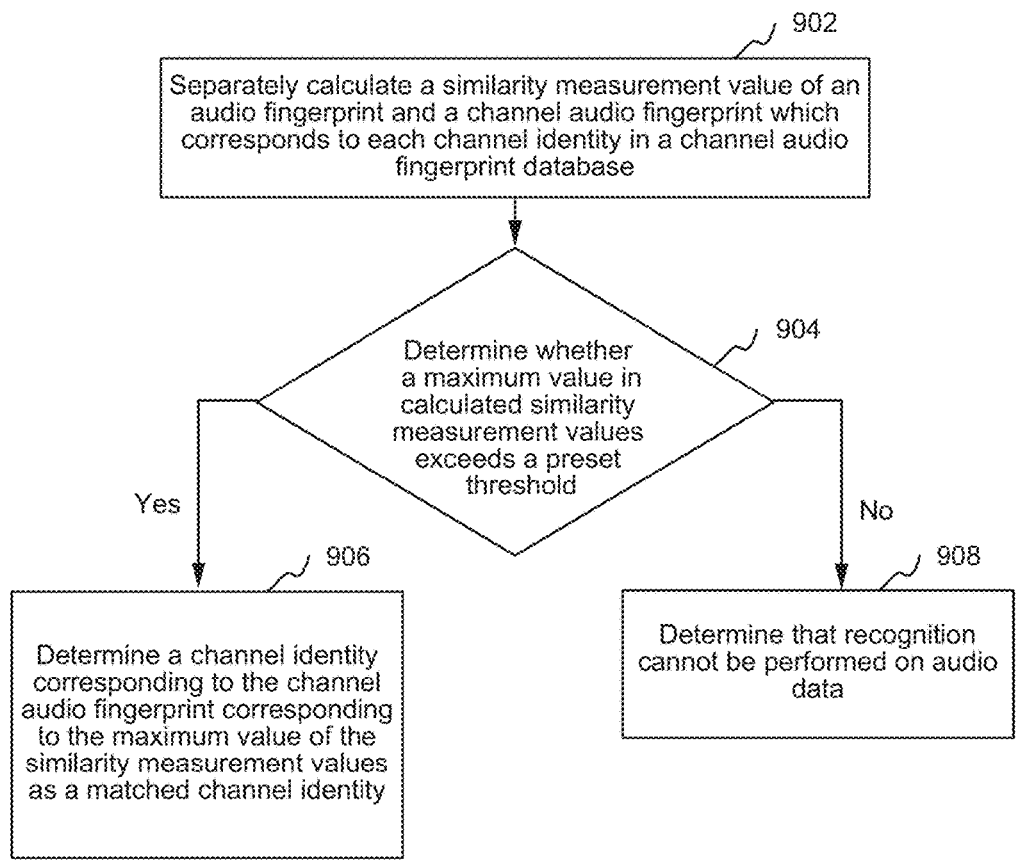
FIG. 9 is a schematic flowchart of steps of determining, according to a channel audio fingerprint database buffered in real time, a matched channel identity corresponding to a channel audio fingerprint matching with an audio fingerprint in accordance with some embodiments.

FIG. 9 is a schematic flowchart of steps of determining (606), according to a channel audio fingerprint database buffered in real time, a matched channel identity corresponding to a channel audio fingerprint matching with an audio fingerprint in accordance with some embodiments. In some embodiments, Step 606 includes the following steps:

Step 902: Separately calculate a similarity measurement value of an audio fingerprint and a channel audio fingerprint which corresponds to each channel identity in a channel audio fingerprint database.

Assume that an audio fingerprint sequence from an electronic device is:

$$F=\{(\tau_1, hashcode_1), (\tau_2, hashcode_2), L, (\tau_L, hashcode_L)\}$$

where $\tau$ is a collection timestamp and may be a time offset away from a start time point of sound recording, hashcode is a Hash value of an audio fingerprint, and L is the number of audio fingerprints in an audio fingerprint sequence.

In some embodiments, a channel audio fingerprint with a same Hash value as that of an audio fingerprint is searched for in the channel audio fingerprint database one after another from channels, so as to obtain a timestamp pair $(t^y, \tau)$ which corresponds to each channel identity and is formed by a collection timestamp of the audio fingerprint and a channel timestamp of the channel audio fingerprint, where the audio fingerprint and the channel audio fingerprint have a same Hash value, y represents a channel identity, and $t^y$ represents a channel timestamp of a channel audio fingerprint corresponding to the channel identity y in the channel audio fingerprint database.

According to the timestamp pair $(t^y, \tau)$ corresponding to each channel identity, statistics collection is performed on a histogram of the number of timestamp pairs which corresponds to a difference between a channel timestamp and a collection timestamp in each timestamp pair. A maximum peak in a histogram corresponding to each channel identity is used as a similarity measurement value of an audio fingerprint and a channel audio fingerprint corresponding to each channel identity in the channel audio fingerprint database. The similarity measurement value refers to a quantized numerical value representing similarity of two pieces of data.

Figure 10:
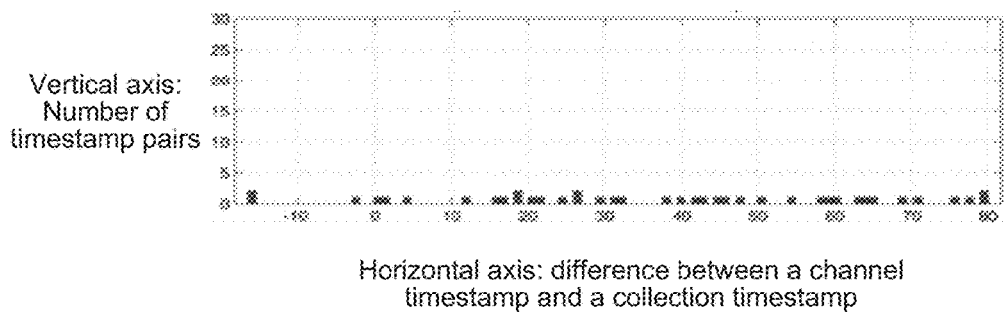
FIG. 10 is a schematic histogram in which the number of timestamp pairs corresponds to a counted difference between a channel timestamp and a collection timestamp when a collected audio fingerprint does not match a channel audio fingerprint of a channel in accordance with some embodiments.
Figure 11:
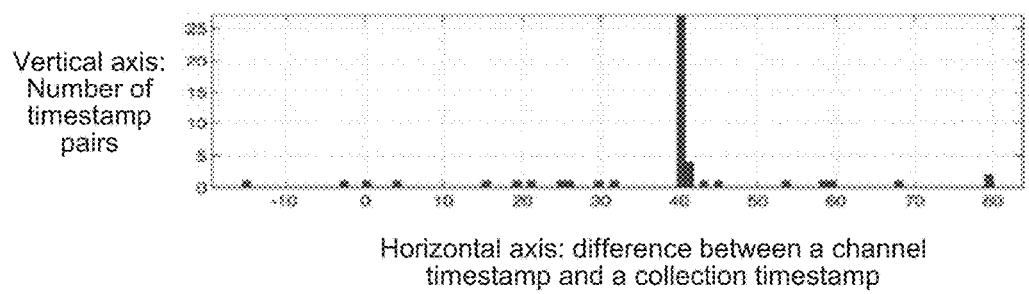
FIG. 11 is a schematic histogram in which the number of timestamp pairs corresponds to a counted difference between a channel timestamp and a collection timestamp when a collected audio fingerprint matches a channel audio fingerprint of a channel in accordance with some embodiments.

As shown in FIG. 10, if an audio fingerprint does not match with a channel audio fingerprint of a channel, there is no obvious peak in the histogram. If the audio fingerprint matches with a channel audio fingerprint of the channel, as shown in FIG. 11, there is an obvious peak in the histogram. Therefore, the maximum peak may be used as the similarity measurement value of the audio fingerprint and the channel audio fingerprint of the channel.

Step 904: Determine whether a maximum value in calculated similarity measurement values exceeds a preset threshold; and if yes, perform Step 906, and if no, perform Step 908.

Similarity measurement values corresponding to each channel identity obtained through calculation are ranked in a descending order of values, a similarity measurement value ranked in the first place is a maximum value in the similarity measurement values, and it is determined whether the maximum value exceeds the preset threshold. The maximum value of the similarity measurement values corresponds to a channel audio fingerprint most similar to the audio fingerprint. The preset threshold may be 20~25.

Step 906: Determine a channel identity corresponding to the channel audio fingerprint corresponding to the maximum value of the similarity measurement values as a matched channel identity. If the maximum value of the similarity measurement values exceeds the preset threshold, it indicates that the channel audio fingerprint corresponding to the maximum value of the similarity measurement values matches with the audio fingerprint, and the channel identity corresponding to the channel audio fingerprint is determined as the matched channel identity.

Step 908: Determine that recognition cannot be performed on audio data. If the maximum value of the similarity measurement values does not exceed the preset threshold, it indicates that even a channel audio fingerprint most similar to the audio fingerprint cannot match with the audio fingerprint. It can be determined that recognition cannot be performed on audio data, and a message indicating failed recognition may be returned to require the electronic device to recollect an audio input.

In this embodiment, in Step 902 to Step 908, a matching degree of audio fingerprints is measured through a similarity measurement value, so as to perform audio recognition to determine a matched channel identity. Therefore, recognition accuracy is high, and search is fast.

Figure 12:
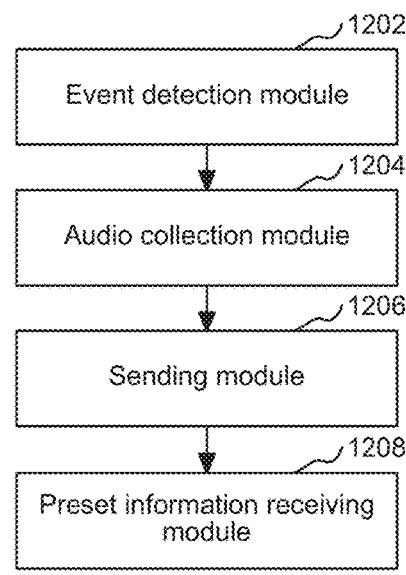
FIG. 12 is a structural block diagram of an information obtaining device in accordance with some embodiments.

FIG. 12 is a structural block diagram of an information obtaining device in accordance with some embodiments. The information obtaining device is used to implement the information obtaining method of the foregoing embodiments. The apparatus includes: an event detection module 1202, an audio collection module 1204, a sending module 1206, and a preset information receiving module 1208.

The event detection module 1202 is used to detect a triggering event. The audio collection module 1204 is used to collect an audio input of a current channel broadcast in real time in an environment to obtain audio data. The sending module 1206 is used to send the audio data, audio feature information extracted according to the audio data, or an audio fingerprint generated according to the audio data to a server, so that the server obtains an audio fingerprint according to the audio data, the audio feature information, or the audio fingerprint and determines, according to a channel audio fingerprint database buffered in real time, a matched channel identity corresponding to a channel audio fingerprint matching with the audio fingerprint. The preset information receiving module 1208 is used to receive preset information which is obtained by the server from a preset information database, is sent by the server, and corresponds to the matched channel identity.

In some embodiment, audio fingerprint collection corresponds to collection time information, and the preset information receiving module 1208 is further used to receive preset information which is obtained by the server from the preset information database, sent by the server, corresponds to the matched channel identity, and has a time attribute matching with the collection time information.

Figure 13:
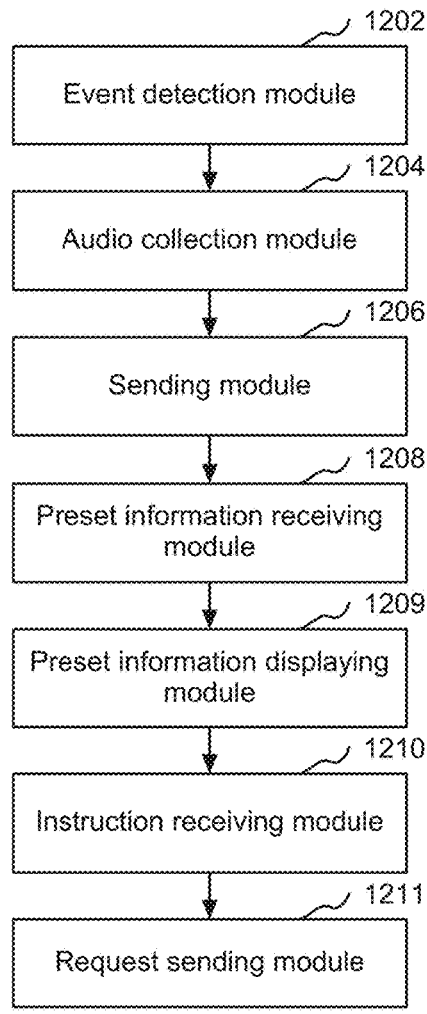
FIG. 13 is a structural block diagram of an information obtaining device in accordance with some embodiments.

FIG. 13 is a structural block diagram of an information obtaining device in accordance with some embodiments. The information obtaining device further includes: a preset information displaying module 1209, an instruction receiving module 1210, and a request sending module 1211. The preset information displaying module 1209 is used to display the preset information. The instruction receiving module 1210 is used to receive a numerical value transfer instruction corresponding to the displayed preset information. The request sending module 1211 is used to send a numerical value transfer request carrying a transfer amount, a first numerical value account identity, and a second numerical value account identity to the server according to the numerical value transfer instruction, so that the server subtracts, according to the numerical value transfer request, the transfer amount from a first numerical value account corresponding to the first numerical value account identity, and adds, according to the numerical value transfer request, the transfer amount to a second numerical value account corresponding to the second numerical value account identity.

In an embodiment, the preset information is commodity information, and the numerical value transfer instruction is a payment instruction. The request sending module 1211 is further used to send a payment request carrying a payment amount, a payment account identity, and a payment receiving account identity to the server according to the payment instruction, so that the server subtracts, according to the payment request, the payment amount from a payment account corresponding to the payment account identity, and adds, according to the payment request, the payment amount to a payment receiving account corresponding to the payment receiving account identity.

In some embodiments, the instruction receiving module 1210 is used to receive an information collection instruction corresponding to the displayed preset information, and the request sending module 1211 is used to record the preset information or an access path of the preset information in a collection list according to the information collection instruction.

Alternatively, the instruction receiving module 1210 is used to receive a display closing instruction corresponding to the displayed preset information, and the request sending module 1211 is used to close, according to the display closing instruction, an interface on which the preset information is displayed.

Alternatively, the instruction receiving module 1210 is used to receive an information sharing instruction corresponding to the displayed preset information, and the request sending module 1211 is used to send, according to the information sharing instruction, the preset information or the access path of the preset information to a terminal specified by the information sharing instruction.

Alternatively, the instruction receiving module 1210 is used to receive an information sharing instruction corresponding to the displayed preset information, and the request sending module 1211 is used to send, according to the information sharing instruction, an information sharing request carrying the preset information or the access path of the preset information to a server, so that the server sends, according to the information sharing request, the preset information or the access path of the preset information to a terminal corresponding to a target user identity carried in the information sharing request.

Figure 14:
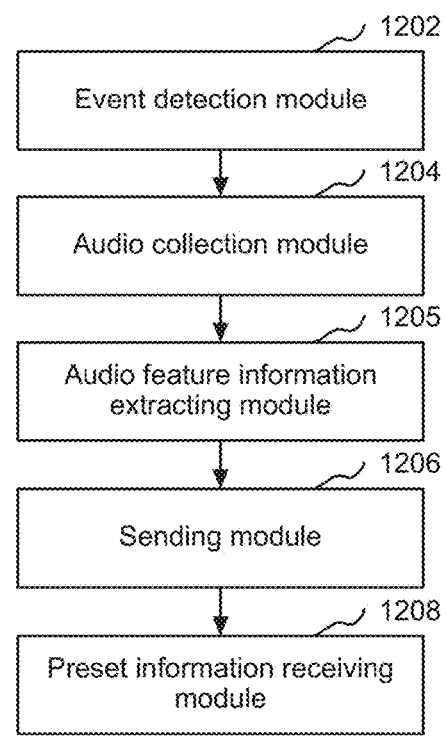
FIG. 14 is a structural block diagram of an information obtaining device in accordance with some embodiments.

FIG. 14 is a structural block diagram of an information obtaining device in accordance with some embodiments. The information obtaining device further includes an audio feature information extracting module 1205. The audio feature information extracting module 1205 is used to perform time-frequency analysis on the audio data to generate a time-frequency diagram of the audio data, split the time-frequency diagram into a preset number of time-frequency sub-diagrams, and extract peak feature points of each time-frequency sub-diagram to constitute a peak feature point sequence corresponding to each time-frequency sub-diagram.

In the information obtaining device, when a triggering event is detected, audio data is obtained by collecting an audio input of a current channel broadcast in real time by a device such as a television in an environment; and the audio data, audio feature information, or an audio fingerprint is sent to a server, so that the server obtains an audio fingerprint according to the audio data, the audio feature information, or the audio fingerprint, and further performs audio recognition to determine a matched channel identity. The matched channel identity is an identity of a channel, of a program being broadcast during audio collection, determined by the server. Received preset information is information related to the program being broadcast. In this way, information is obtained by means of sound recognition. As long as audio collection is triggered on an electronic device, the server may perform audio recognition to obtain information related to a program being broadcast in a current channel, thereby greatly improving information obtaining efficiency.

Figure 15:
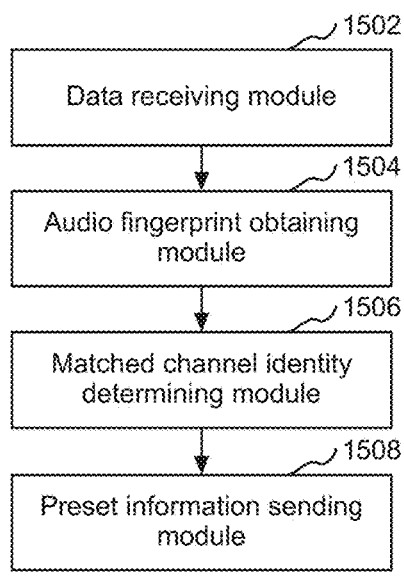
FIG. 15 is a structural block diagram of an information pushing device in accordance with some embodiments.

FIG. 15 is a structural block diagram of an information pushing device in accordance with some embodiments. The device includes: a data receiving module 1502, an audio fingerprint obtaining module 1504, a matched channel identity determining module 1506, and a preset information sending module 1508.

The data receiving module 1502 is used to receive audio data, audio feature information extracted according to the audio data, or an audio fingerprint generated according to the audio data. The audio fingerprint obtaining module 1504 is used to obtain the received audio fingerprint, generate the audio fingerprint according to the received audio data, or generate the audio fingerprint according to the received audio feature information.

The matched channel identity determining module 1506 is used to determine, according to a channel audio fingerprint database buffered in real time, a matched channel identity corresponding to a channel audio fingerprint matching with the audio fingerprint. The preset information sending module 1508 is used to obtain, from a preset information database, preset information corresponding to the matched channel identity, and send the preset information to an electronic device.

In some embodiments, audio fingerprint collection corresponds to collection time information, and the preset information sending module 1508 is further used to obtain, from the preset information database, the preset information which corresponds to the matched channel identity, and has a time attribute matching with the collection time information; and send the preset information to the electronic device.

Figure 16:
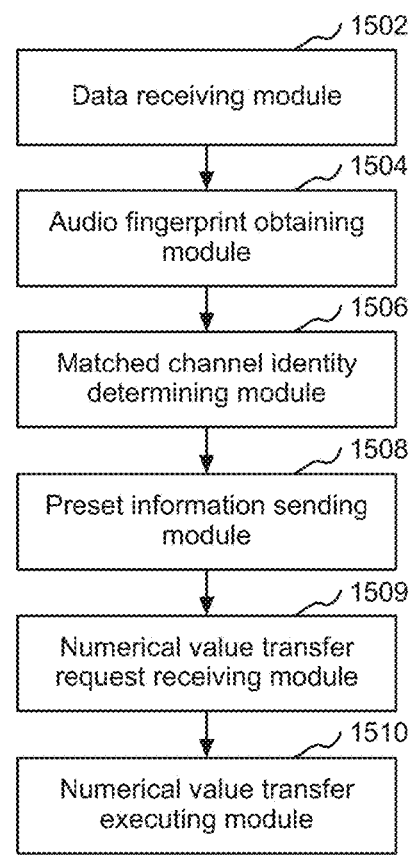
FIG. 16 is a structural block diagram of an information pushing device in accordance with some embodiments.

FIG. 16 is a structural block diagram of an information pushing device in accordance with some embodiments. The information pushing device further includes: a numerical value transfer request receiving module 1509 and a numerical value transfer executing module 1510. The numerical value transfer request receiving module 1509 is used to receive a numerical value transfer request which carries a transfer amount, a first numerical value account identity, and a second numerical value account identity and is sent by the electronic device in response to the preset information. The numerical value transfer executing module 1510 is used to subtract, according to the numerical value transfer request, the transfer amount from a first numerical value account corresponding to the first numerical value account identity, and add, according to the numerical value transfer request, the transfer amount to a second numerical value account corresponding to the second numerical value account identity.

In some embodiments, the preset information is commodity information, and the numerical value transfer request receiving module 1509 is further used to receive a payment request which carries a payment amount, a payment account identity, and a payment receiving account identity and is sent by the electronic device in response to the commodity information. The numerical value transfer executing module 1510 is further used to subtract, according to the payment request, the payment amount from the payment account corresponding to the payment account identity, and add, according to the payment request, the payment amount to the payment receiving account corresponding to the payment receiving account identity.

Figure 17:
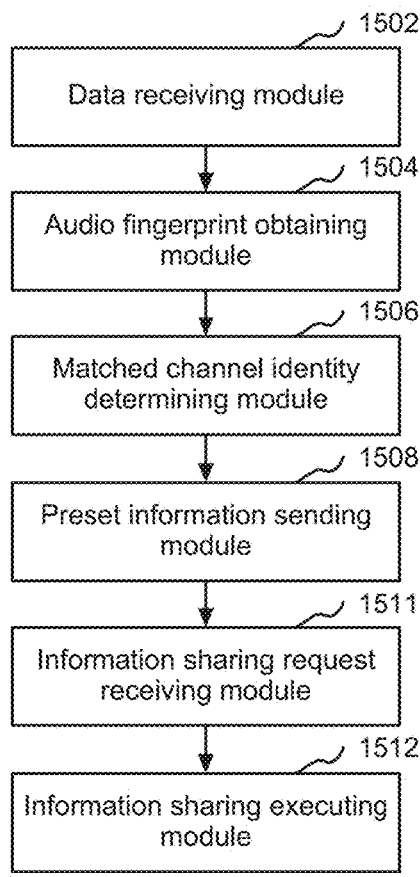
FIG. 17 is a structural block diagram of an information pushing device in accordance with some embodiments.

FIG. 17 is a structural block diagram of an information pushing device in accordance with some embodiments. The information pushing apparatus further includes: an information sharing request receiving module 1511 and an information sharing executing module 1512. The information sharing request receiving module 1511 is used to receive an information sharing request which is sent by the electronic device in response to the preset information and carries the preset information or an access path of the preset information. The information sharing executing module 1512 is used to send, according to the information sharing request, the preset information or the access path of the preset information to a terminal corresponding to a target user identity carried in the information sharing request.

In some embodiments, the audio feature information is a peak feature point sequence corresponding to each time-frequency sub-diagram of the audio data. The audio fingerprint obtaining module 1504 is further used to perform pairing processing on each peak feature point in the peak feature point sequence of each time-frequency sub-diagram of the audio data to obtain a peak feature point pair corresponding to each time-frequency sub-diagram of the audio data, and perform a Hash operation according to the peak feature point pair corresponding to each time-frequency sub-diagram of the audio data to obtain an audio fingerprint.

Figure 18:
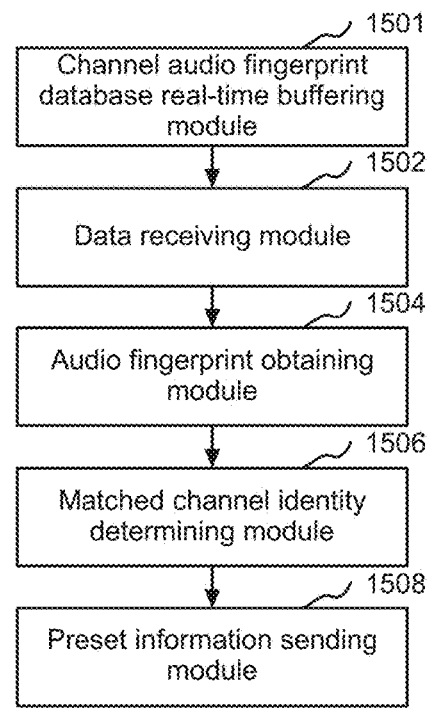
FIG. 18 is a structural block diagram of an information pushing device in accordance with some embodiments.

FIG. 18 is a structural block diagram of an information pushing device in accordance with some embodiments. In some embodiments, the information pushing device further includes a channel audio fingerprint database real-time buffering module 1501, used to obtain in real time a channel audio data flow corresponding to each channel identity, perform time-frequency analysis on the real-time channel audio data flow corresponding to each channel identity to generate a time-frequency diagram of the real-time channel audio data flow corresponding to each channel identity, split the time-frequency diagram of the real-time channel audio data flow corresponding to each channel identity into a preset number of time-frequency sub-diagrams, extract peak feature points of each time-frequency sub-diagram corresponding to each channel identity to constitute a peak feature point sequence of each time-frequency sub-diagram corresponding to each channel identity, perform pairing processing on the peak feature point sequence of each time-frequency sub-diagram corresponding to each channel identity to obtain a peak feature point pair of each time-frequency sub-diagram corresponding to each channel identity, perform a Hash operation on the peak feature point pair of each time-frequency sub-diagram corresponding to each channel identity to obtain a channel audio fingerprint corresponding to each channel identity, and cyclically buffer a correspondence between a channel audio fingerprint whose channel timestamp is within a preset time length away from a current time and a channel identity in a channel audio fingerprint database.

In some embodiments, the matched channel identity determining module 1506 is used to separately calculate a similarity measurement value of an audio fingerprint and a channel audio fingerprint which corresponds to each channel identity in the channel audio fingerprint database; determine whether a maximum value in calculated similarity measurement values exceeds a preset threshold; and if yes, determine a channel identity corresponding to a channel audio fingerprint corresponding to the maximum value of the similarity measurement values as the matched channel identity. If determining that the maximum value in the calculated similarity measurement values does not exceed the preset threshold, the matched channel identity determining module 1506 is used to determine that recognition cannot be performed on audio data.

In the information pushing apparatus, one of audio data, audio feature information, and an audio fingerprint that are collected by the electronic device is received, so as to obtain the audio fingerprint. A matched channel identity corresponding to a channel audio fingerprint matching with the audio fingerprint is determined using a channel audio fingerprint database buffered in real time. The matched channel identity is an identity of a channel, of a program being broadcast during audio collection, determined by the server. The preset information which is sent by the server to the electronic device and corresponds to the matched channel identity is information related to the program being broadcast. Therefore, when a device in an environment where a user is located, such as a television, broadcasts real-time sound information, remote service support is provided so that the user can efficiently obtain information related to the broadcast real-time sound information, so as to efficiently push information needed by the electronic device to the electronic device.

Figure 19:
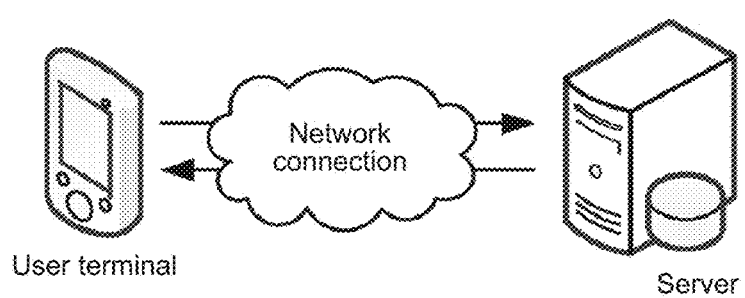
FIG. 19 is a schematic structural diagram of an information interaction system in accordance with some embodiments.

FIG. 19 is a schematic structural diagram of an information interaction system in accordance with some embodiments. The system includes an electronic device and a server, where the electronic device is used to implement the information obtaining method of the foregoing embodiments, and the server is used to implement the information pushing method of the foregoing embodiments. The electronic device is used to: when detecting a triggering event, collect an audio input of a current channel broadcast in real time in an environment to obtain audio data. The electronic device is further used to send the audio data, audio feature information extracted according to the audio data, or an audio fingerprint generated according to the audio data to the server.

The server is used to obtain the received audio fingerprint, generate the audio fingerprint according to the received audio data, or generate the audio fingerprint according to the received audio feature information. The server is further used to determine, according to a channel audio fingerprint database buffered in real time, a matched channel identity corresponding to a channel audio fingerprint matching with the audio fingerprint. The server is further used to obtain, from a preset information database, preset information corresponding to the matched channel identity, and send the preset information to the electronic device.

The electronic device is further used to receive the preset information. In some embodiments, audio fingerprint collection corresponds to collection time information, and the server is further used to: obtain, from the preset information database, the preset information which corresponds to the matched channel identity and has a time attribute matching with the collection time information, and send the preset information to the electronic device.

The electronic device is further used to display the preset information, receive a numerical value transfer instruction corresponding to the displayed preset information, and send, according to the numerical value transfer instruction, a numerical value transfer request carrying a transfer amount, a first numerical value account identity, and a second numerical value account identity to the server. The server is further used to subtract, according to the numerical value transfer request, the transfer amount from a first numerical value account corresponding to the first numerical value account identity, and add, according to the numerical value transfer request, the transfer amount to a second numerical value account corresponding to the second numerical value account identity.

In some embodiments, the preset information is commodity information, and the electronic device is further used to display the commodity information; receive a payment instruction corresponding to the displayed commodity information; and send, according to the payment instruction, a payment request carrying a payment amount, a payment account identity, and a payment receiving account identity to the server. The server is further used to subtract, according to the payment request, the payment amount from a payment account corresponding to the payment account identity, and add, according to the payment request, the payment amount to a payment receiving account corresponding to the payment receiving account identity.

In some embodiments, the electronic device is further used to display the preset information, receive an information sharing instruction corresponding to the displayed preset information, and send, according to the information sharing instruction, an information sharing request carrying the preset information or an access path of the preset information to the server. The server is further used to send, according to the information sharing request, the preset information or the access path of the preset information to a terminal corresponding to a target user identity carried in the information sharing request.

In some embodiments, the server is further used to obtain in real time a channel audio data flow corresponding to each channel identity, perform time-frequency analysis on the real-time channel audio data flow corresponding to each channel identity to generate a time-frequency diagram of the real-time channel audio data flow corresponding to each channel identity, split the time-frequency diagram of the real-time channel audio data flow corresponding to each channel identity into a preset number of time-frequency sub-diagrams, extract peak feature points of each time-frequency sub-diagram corresponding to each channel identity to constitute a peak feature point sequence of each time-frequency sub-diagram corresponding to each channel identity, perform pairing processing on the peak feature point sequence of each time-frequency sub-diagram corresponding to each channel identity to obtain a peak feature point pair of each time-frequency sub-diagram corresponding to each channel identity, perform a Hash operation on the peak feature point pair of each time-frequency sub-diagram corresponding to each channel identity to obtain a channel audio fingerprint corresponding to each channel identity, and cyclically buffer a correspondence between a channel audio fingerprint whose channel timestamp is within a preset time length away from a current time and a channel identity in a channel audio fingerprint database.

In some embodiments, the electronic device is further used to perform time-frequency analysis on the audio data to generate a time-frequency diagram of the audio data, split the time-frequency diagram into a preset number of time-frequency sub-diagrams, and extract peak feature points of each time-frequency sub-diagram to constitute a peak feature point sequence corresponding to each time-frequency sub-diagram. The server is used to perform pairing processing on each peak feature point in the peak feature point sequence of each time-frequency sub-diagram of the audio data to obtain a peak feature point pair corresponding to each time-frequency sub-diagram of the audio data, and perform a Hash operation according to the peak feature point pair corresponding to each time-frequency sub-diagram of the audio data to obtain an audio fingerprint.

In some embodiments, the electronic device may be used to separately compress time data and frequency data in the peak feature point sequence of each time-frequency sub-diagram, and send the compressed time data and the compressed frequency data to the server. The server may be used to separately decompress the received compressed data of the time data and the received compressed data of the frequency data to obtain the peak feature point sequence of each time-frequency sub-diagram of the audio data.

In some embodiments, the server is further used to separately calculate a similarity measurement value of an audio fingerprint and a channel audio fingerprint which corresponds to each channel identity in the channel audio fingerprint database; determine whether a maximum value in calculated similarity measurement values exceeds a preset threshold; and if yes, determine a channel identity corresponding to a channel audio fingerprint corresponding to the maximum value of the similarity measurement values as the matched channel identity. The server is further used to: if determining that the maximum value in the calculated similarity measurement values does not exceed the preset threshold, determine that recognition cannot be performed on audio data.

In the information interaction system, when detecting a triggering event, an electronic device obtains audio data by collecting an audio input of a current channel broadcast in real time by a device such as a television in an environment; and sends the audio data, audio feature information, or an audio fingerprint to a server, so that the server obtains an audio fingerprint according to the audio data, the audio feature information, or the audio fingerprint, and further performs audio recognition to determine a matched channel identity. The matched channel identity is an identity of a channel, of a program being broadcast during audio collection, determined by the server. Received preset information is information related to the program being broadcast. In this way, information is skillfully obtained by means of sound recognition. As long as audio detection is triggered on an electronic device, the server may perform audio recognition to obtain information related to a program being broadcast in a current channel, thereby greatly improving information obtaining and pushing efficiency.

Figure 20:
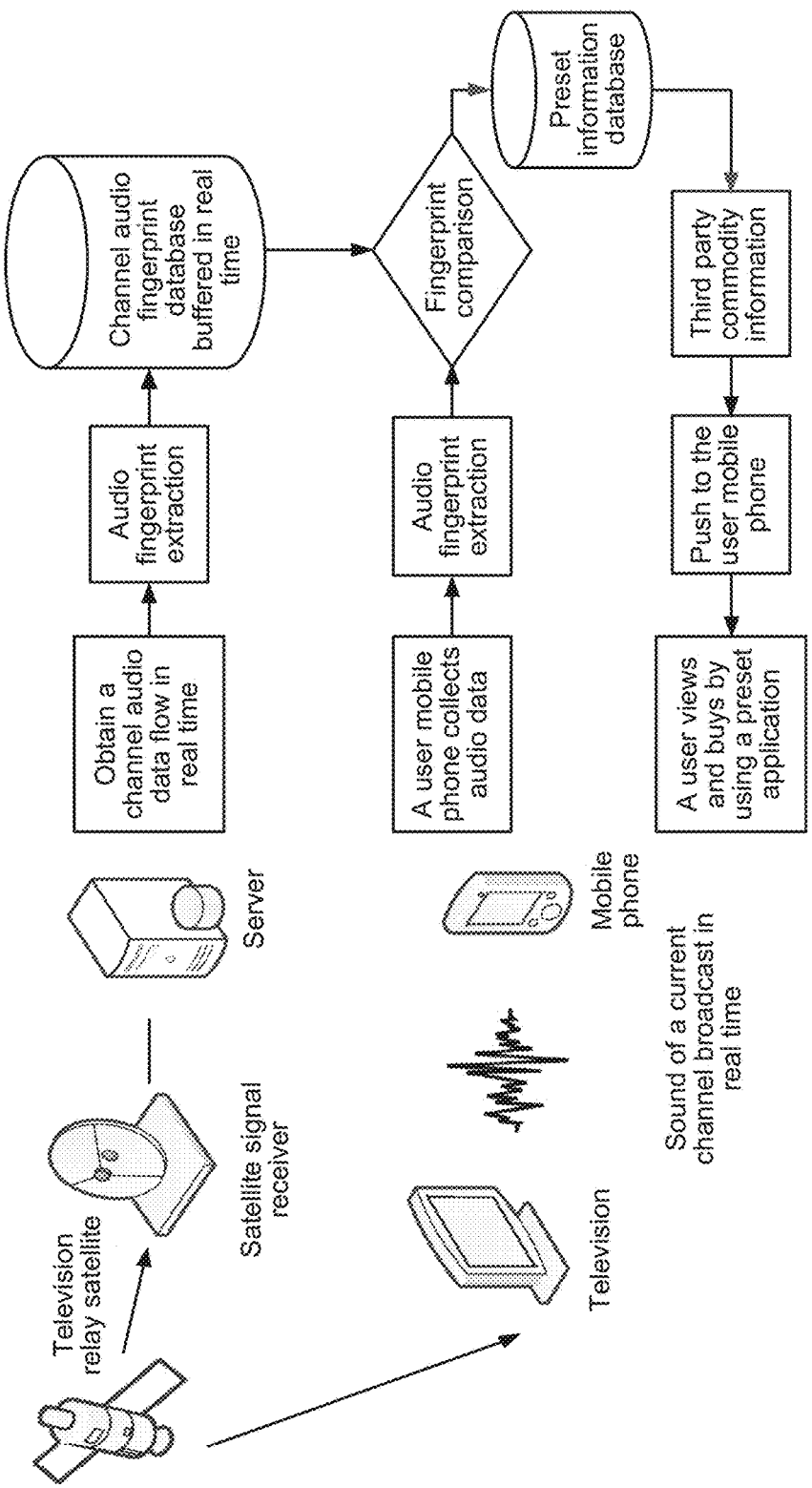
FIG. 20 is a schematic diagram of a working environment of an information obtaining system in accordance with some embodiments.

FIG. 20 is a schematic diagram of a working environment of an information obtaining system in accordance with some embodiments. In some embodiments, an example in which the information obtaining method is applied to a mobile phone is used for description. As shown in FIG. 20, the application scenario includes the following steps:

A server obtains in real time a channel audio data flow corresponding to each channel identity, and generates, according to the obtained channel audio data flow, a channel audio fingerprint corresponding to each channel identity. The channel audio fingerprint includes a channel timestamp. The server cyclically buffers a correspondence between a channel audio fingerprint whose channel timestamp is within a preset time length away from a current time and a channel identity in a channel audio fingerprint database.

When a user watches a television program of a channel at home and sees an advertisement that interests the user, the user immediately shakes a mobile phone. The mobile phone senses the motion of the mobile phone using a motion sensor of the mobile phone, and starts a microphone to record an environment sound to obtain PCM audio which lasts for 5-15 seconds, whose sampling frequency is 8 kHz, and which is quantized with 16 bits, where the recorded audio is audio data. Then, the mobile phone obtains audio feature information by performing feature extraction from the audio data; generates, according to the audio feature information, an audio fingerprint including a collection timestamp; and sends the audio fingerprint to the server in a communication manner such as Wifi (a technology enables wireless network access through a radio wave), 2G (a second-generation mobile communications technology), 3G (a third-generation mobile communications technology), or 4G (a fourth-generation mobile communications technology).

The server obtains the audio fingerprint, and determines, according to a channel audio fingerprint database buffered in real time, a matched channel identity corresponding to a channel audio fingerprint matching with the audio fingerprint. Preset information in a preset information database stored in the server is commodity information; and each piece of commodity information corresponds to a channel identity and includes a start time mark and an end time mark. The server searches the preset information database for commodity information whose channel identity is the matched channel identity and whose collection timestamp is within a time range indicated by the start time mark and the end time mark; and sends the found commodity information to the mobile phone, where the commodity information is commodity information related to the advertisement watched by the user.

The mobile phone displays the commodity information and may display information such as a commodity name, a commodity picture, a commodity price, a commodity introduction, and promotion information. The user may perform an operation, such as sharing, collection, or closing, on the commodity information, and may also directly place an order to trigger a payment instruction. After placing the order, the user determines consignee information, and then makes a payment. The user may choose to make an online payment and send a payment request to the server to complete the payment, or choose to send a payment request to the server using a payment application to complete a payment operation, or the user may also choose payment on delivery. Then, the user waits for the delivery to complete a shopping process.

Figure 21A:
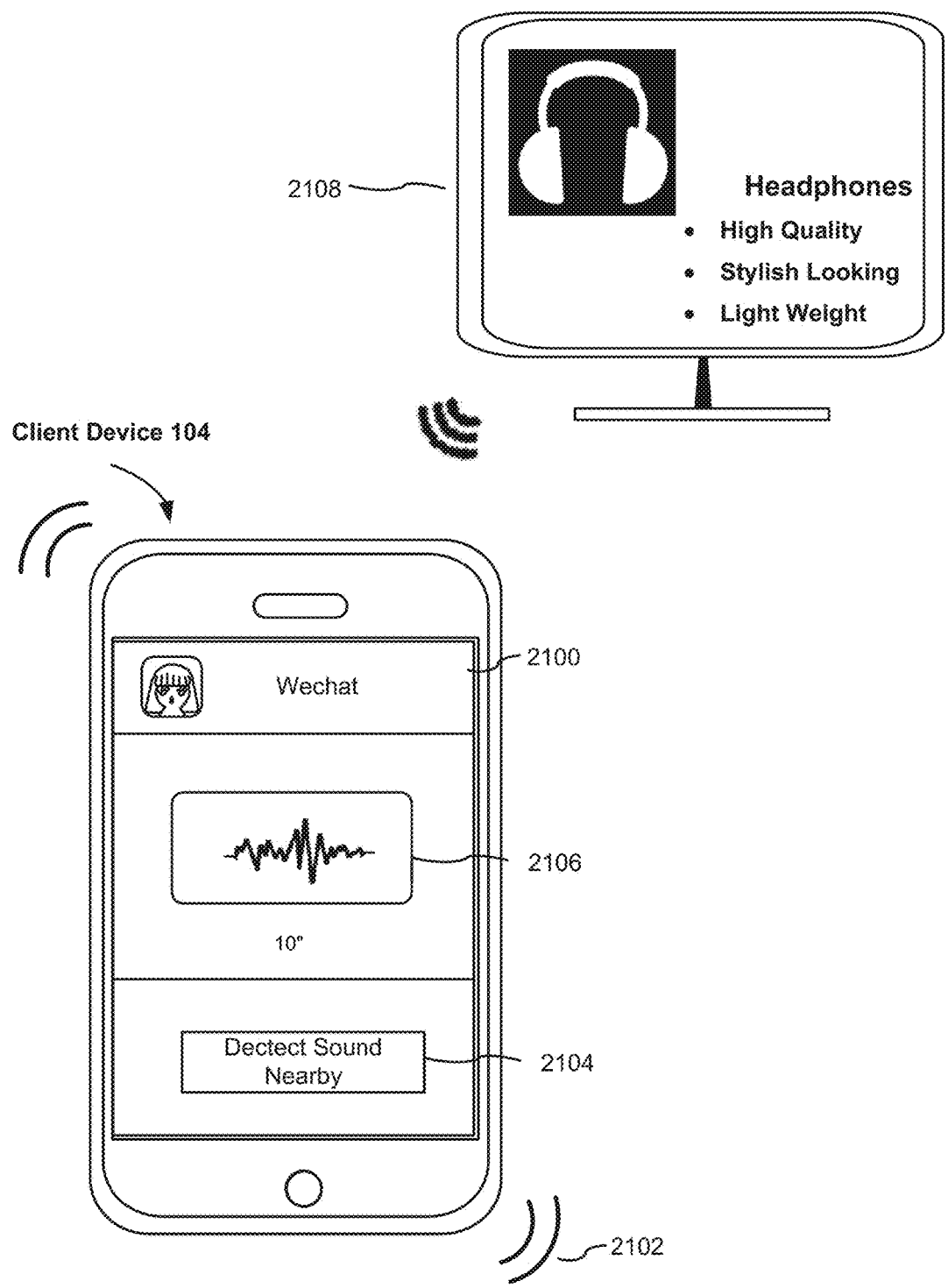
FIGS. 21A-21E are exemplary embodiments of user interfaces for obtaining information in accordance with some embodiments.

FIGS. 21A-21E are exemplary embodiments of user interfaces for obtaining information in accordance with some embodiments. FIG. 21A is an exemplary user interface for capturing an audio input 2106 on a social networking application 2100. The audio input may be captured from television commercial 2108 broadcasted on the television. In some embodiments, electronic device 104 captures the audio input in response to a triggering event, such as a "shake" motion 2102 detected by a motion sensor of electronic device, or pressing a button 2104 to initiate microphone of electronic device 104 to detect sound nearby. The captured audio input is sent to system server 108.

Figure 21B:
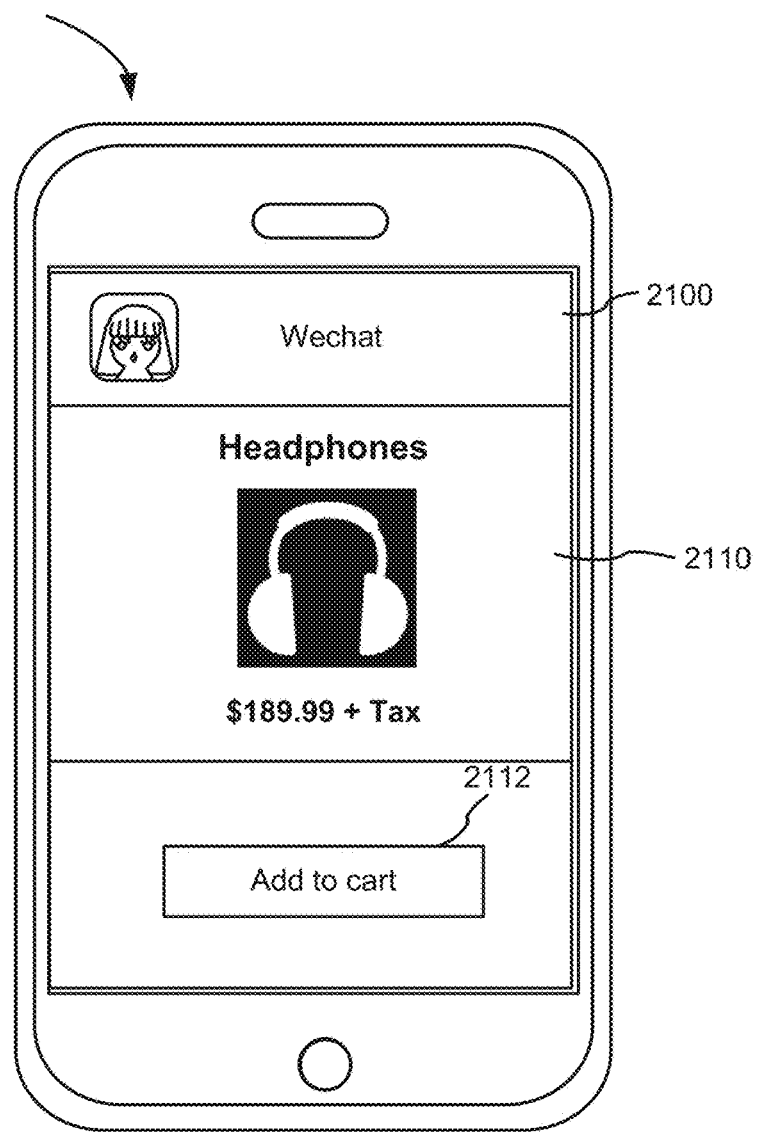

FIG. 21B shows an exemplary embodiment of product information 2110 retrieved from server system 108 and displayed on electronic device 104. Product information 2110 is obtained based on audio input 2106 and associated with television commercial 2108. In some embodiments, the product information is obtained by comparing at least one audio feature of audio input 2106 with signature audio features extracted from audio of television commercial 2108. In embodiments, the product information is displayed within social networking platform 2100. A purchase order of the product can be submitted and processed on social networking platform 2100 using transaction information associated with the user account.

Figure 21C:
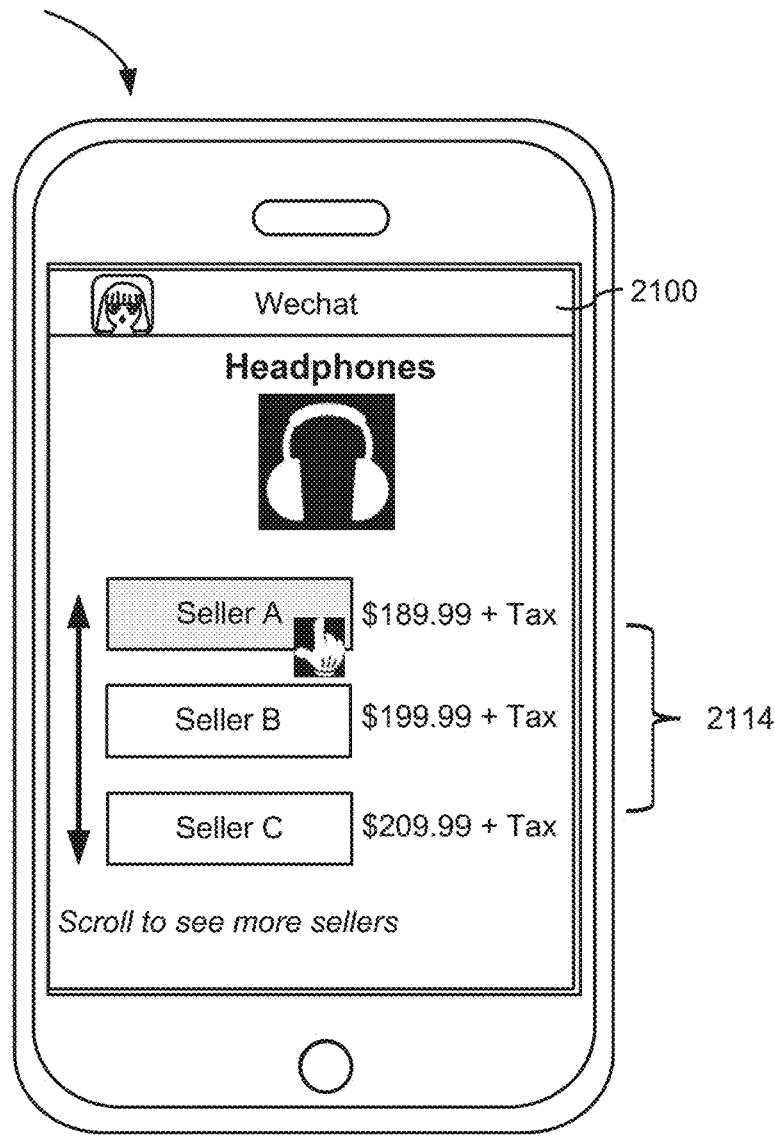
Figure 21D:

In FIG. 21C, in some embodiments, a listing of sellers 2114 can be identified based on the product information, and presented to the user. The user can select one of the sellers to purchase the product from as shown in FIG. 21D.

Figure 21E:
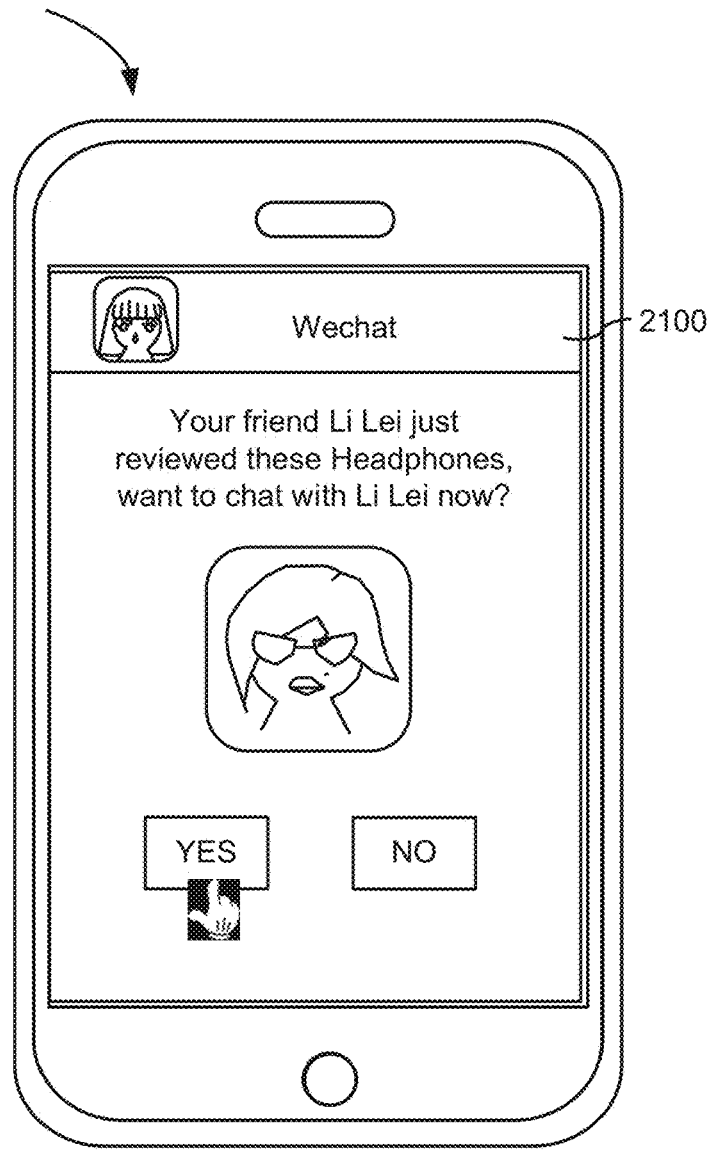

In FIG. 21E, in some embodiments, a notice is sent to electronic device 104 when server system 108 detects an activity related to the product from a user's contact (e.g., Li Lei) within the social networking application. For example, the server detects that Li Lei just posted a review on the product. Thus, a notification is presented to the user to ask whether the user wants to chat with the user's contact within the social networking application. Further detailed embodiments of FIGS. 21A-21E are illustrated in conjunction with method 2200 of FIGS. 22A-22D.

FIGS. 22A-22D are flowchart diagrams illustrating a method 2200 of obtaining information based on an audio input in accordance with some embodiments. In some embodiments, method 2200 is performed by electronic device 104 with one or more processors and memory. For example, in some embodiments, method 2200 is performed by electronic device 104 (FIGS. 1A and 3) or a component thereof. In some embodiments, method 2200 is governed by instructions that are stored in a non-transitory computer readable storage medium and the instructions are executed by one or more processors of the electronic device. Optional operations are indicated by dashed lines (e.g., boxes with dashed-line borders).

In method 2200, while running a social networking application, an electronic device sends (2202), a first audio input (e.g., audio input 2106, FIG. 21A) to a server hosting the social networking application, wherein the first audio input is captured in response to a triggering event. In response to a triggering event, such as by initiating a "shake" function of the social networking application, when a motion sensor of the electronic device detects a predetermined motion of the device (e.g., the shaking of the device caused by the user holding the device), the electronic device starts to capture surrounding sounds and generates an audio input for the social network application.

Alternatively, in some embodiments, by initiating a "detect sound nearby" function of the social networking application, the microphone of the electronic device starts to capture and generate an audio input as soon as sounds (e.g., TV sounds) are detected in the surrounding environment. In some embodiments, the "detect sound nearby" optionally filter out sounds that are unlikely to be interesting to the user in the captured recording. For example, the detect sound nearby will only keep speech and music detected in the surrounding environment, but will filter out ambient noise such as the air conditioning fan turning, dog barking, cars passing by, etc. In some implementations, the first audio input includes captured audio recording of at least a first advertisement broadcasted on a first TV or radio broadcast channel.

In some embodiments, the triggering event may also include pressing "Hold to Talk" button and recording a user's voice instruction. For example, the user's voice instruction may provide information regarding the user's desire for a particular product mentioned in the advertisement in TV when multiple products are mentioned. In another example, the user's voice instruction may specify that it is the advertisement immediately preceding the current advertisement that the user is actually interested in. The user's voice instruction can be processed using speech recognition techniques implemented at the electronic device or at the server.

The electronic device retrieves (2204), from the server, a product information item associated with a product identified based on the first audio input, wherein the product information item is obtained by comparing at least one audio feature of the first audio input with signature audio features extracted from audio of TV or radio broadcast within a predetermined time span. The electronic device then displays (2206) the retrieved product information item (e.g., product information 2110, FIG. 21B) to a user of the electronic device within the social networking application.

In some implementations, the audio recording is analyzed at the electronic device to extract audio feature information such as an audio fingerprint, and the electronic device sends the extracted audio feature information to the server. In some implementations, the audio input is directly sent to the server and analyzed by the server to extract the audio feature information.

In some embodiments, at the server, the product information item is obtained by: determining whether the first audio feature matches any of the signature audio features in a database at the server, where the signature audio features in the database are extracted from real time audio broadcast of TV or radio programs including commercial advertisements; and in response to a determination that the first audio feature matches a particular signature audio feature in the database, identifying the production information associated with the audio broadcast (e.g., a TV or radio commercial advertisement) having the particular signature audio feature that matches the first audio feature. In some implementations, the signature audio feature is associated with channel information and time information for the corresponding TV or radio broadcast segment.

In some embodiments, before the TV or radio broadcast segment is aired on TV or radio, the corresponding product information, time information, channel information associated with the broadcast segment may be provided to the server by the broadcaster or advertiser, and stored in the database, rather than being extracted in real time by the server during the actual broadcast.

Referring to FIG. 22B, in some embodiments, the first audio input comprises (2208) an audio recording of at least a portion of a first advertisement for a product broadcast on TV at a first time. The at least one audio feature of the first audio input matches (2208) a first signature audio feature extracted from the first advertisement for the product broadcast on TV on a first channel at the first time. The product information item is identified (2208) based on advertisement information associated with the first channel and the first time.

In some implementations, the first audio input is accompanied with the timestamp for when the audio recording of the advertisement was captured by the electronic device. This timestamp can be used by the server to match the broadcast times for different advertisements to identify the captured first advertisement. In some embodiments, the user may optionally enter the channel number for the TV broadcast at the time that the recording was captured, so that the identification of the advertisement can be more accurate. The channel number can be sent to the server with the audio recording/audio fingerprint and the timestamp.

In some embodiments, the user can capture a recording of a current broadcast, and let the server determine what channel the TV is currently on, and use the voice command to tell the server to identify the commercial that was on the same channel at an earlier time (e.g., "Find the last ad during the last commercial break on this channel.", or "The Macy's ad on this channel"). In some embodiments, the voice command is sent to the server with the audio recording, and the timestamp of the recording.

In some embodiments, the first audio input includes the audio recording, and the audio finger print can be extracted from the audio recording. Alternatively, the first audio input includes the audio fingerprint extracted from the audio recording without including the actual recording. The first audio input can be accompanied by other associated information, such as the timestamp, the channel number, the user's voice command, and other information that the electronic device has. In further embodiments, the channel number and time information may be determined based on an identified audio recording at the server.

In some embodiments, the trigger event includes (2210) receiving a voice instruction from the user of the electronic device, the voice instruction including one or more keywords. The first audio input comprises (2210) an audio recording of at least a portion of a first program broadcast on TV at a first time. The at least one audio feature of the first audio input matches (2210) a first signature audio feature extracted from the first program broadcast on TV on a first channel at the first time. The product information item is identified (2210) based on the first channel, the first time, and the one or more keywords.

In some embodiments, the one or more keywords include a product name, a time, or other information that can be used to determine the product that the user is interested in. For example, if the first program is an ad from Macy's on channel 2 at 9:32 pm, and the voice command says "the previous ad." The server will find the ad immediately preceding the Macy's ad on channel 2, which may be a McDonald's ad on channel 2 at 9:31 pm. In another example, the voice command may be "a different ad from the same advertiser." The server will find another Macy's ad that is on the same channel or a different channel broadcast at an earlier time. In another example, the voice command may be "Saturday sale", the server will find a Macy's ad that is related to a Saturday sale on the same channel or different channel broadcast at an earlier time.

Once the server has found the program/ad captured in the audio input based on the audio signature, the server can obtain information (e.g., channel, advertiser, product, time, content, product, etc.) of the currently captured program, the server can use the identified information and the user's voice instruction to identify the program or ad that the user is actually interested in, and then the product information that the user is interested in.

Figure 22A:
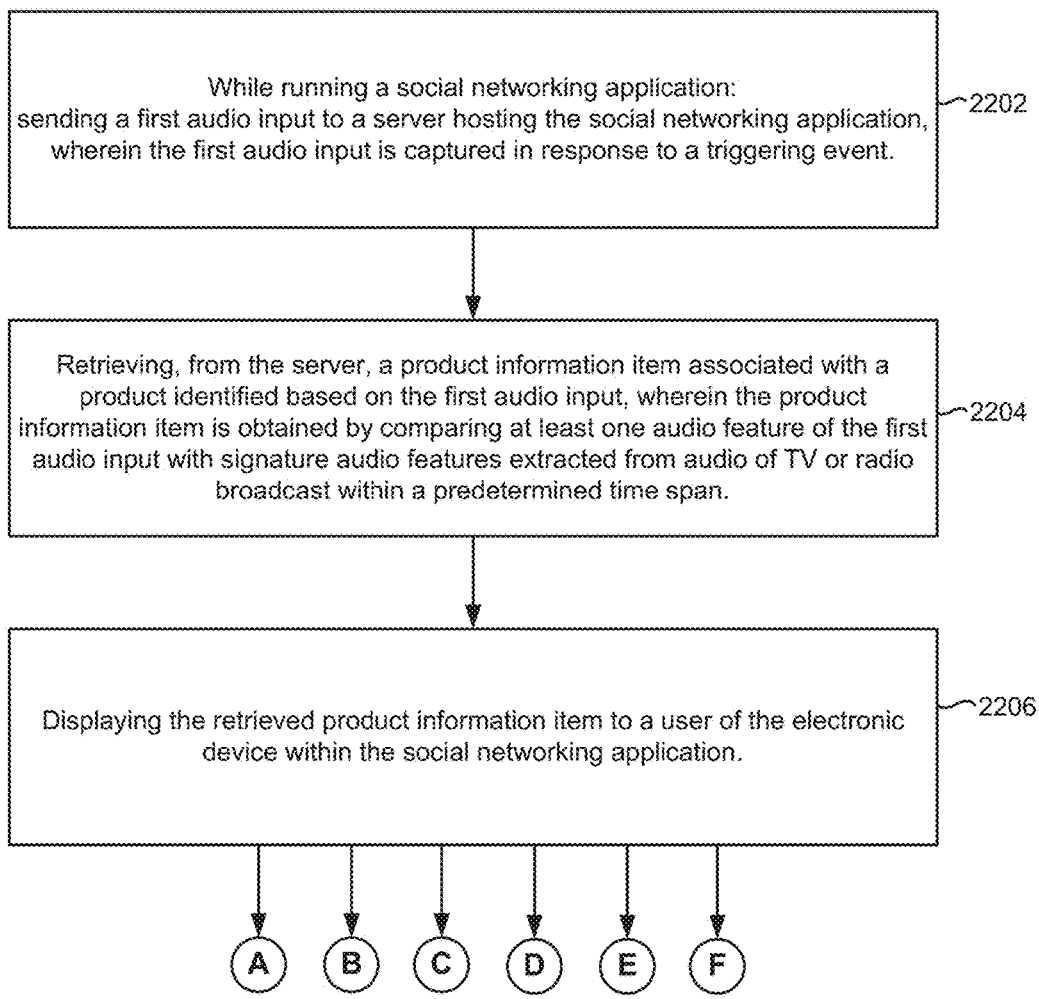
Figure 22C:
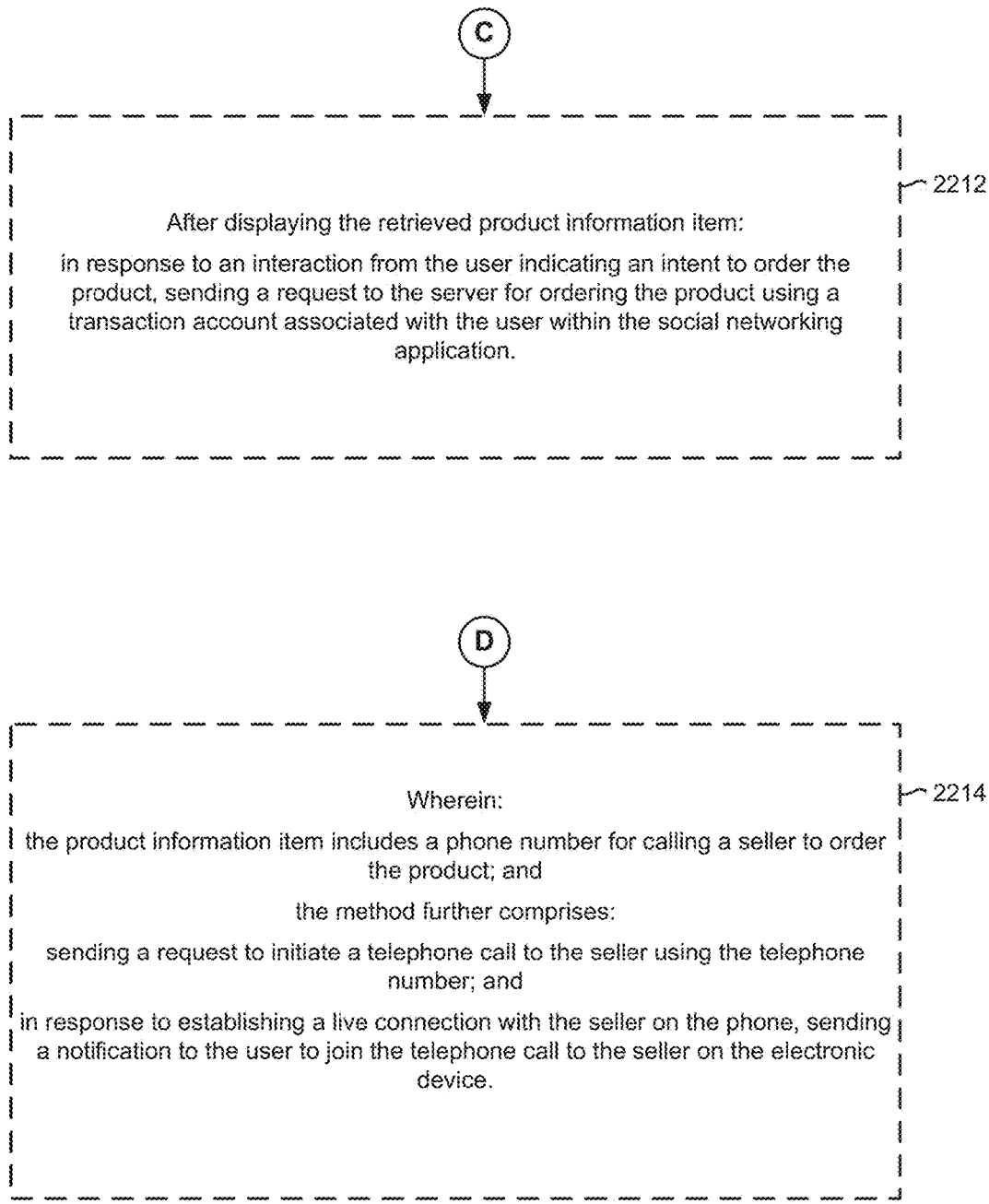

Referring to FIG. 22C, in some embodiments, after displaying the retrieved product information item, and in response to an interaction from the user indicating an intent to order the product, the electronic device sends (2212) a request to the server for ordering the product using a transaction account associated with the user within the social networking application (e.g., as shown in FIG. 21D).

In some embodiments, the product information item includes (2214) a phone number for calling a seller to order the product. The electronic device sends (2214) a request to initiate a telephone call to the seller using the telephone number. In response to establishing a live connection with the seller on the phone, the electronic device sends (2214) a notification to the user to join the telephone call to the seller on the electronic device.

For example, the electronic device may ask the server to try to establish a call to the seller, and once a live sales agent has answered the call, the server notifies the user using the social networking application or calls the user on the electronic device. Once the user answers, the server joins the two calls to enable the user to talk to the sales agent directly. This way, the user does not have to wait on the online for the sales agent to pick up. In some embodiments, the call is initiated on the electronic device, and the user is notified when a live person answers the call.

Figure 22D:
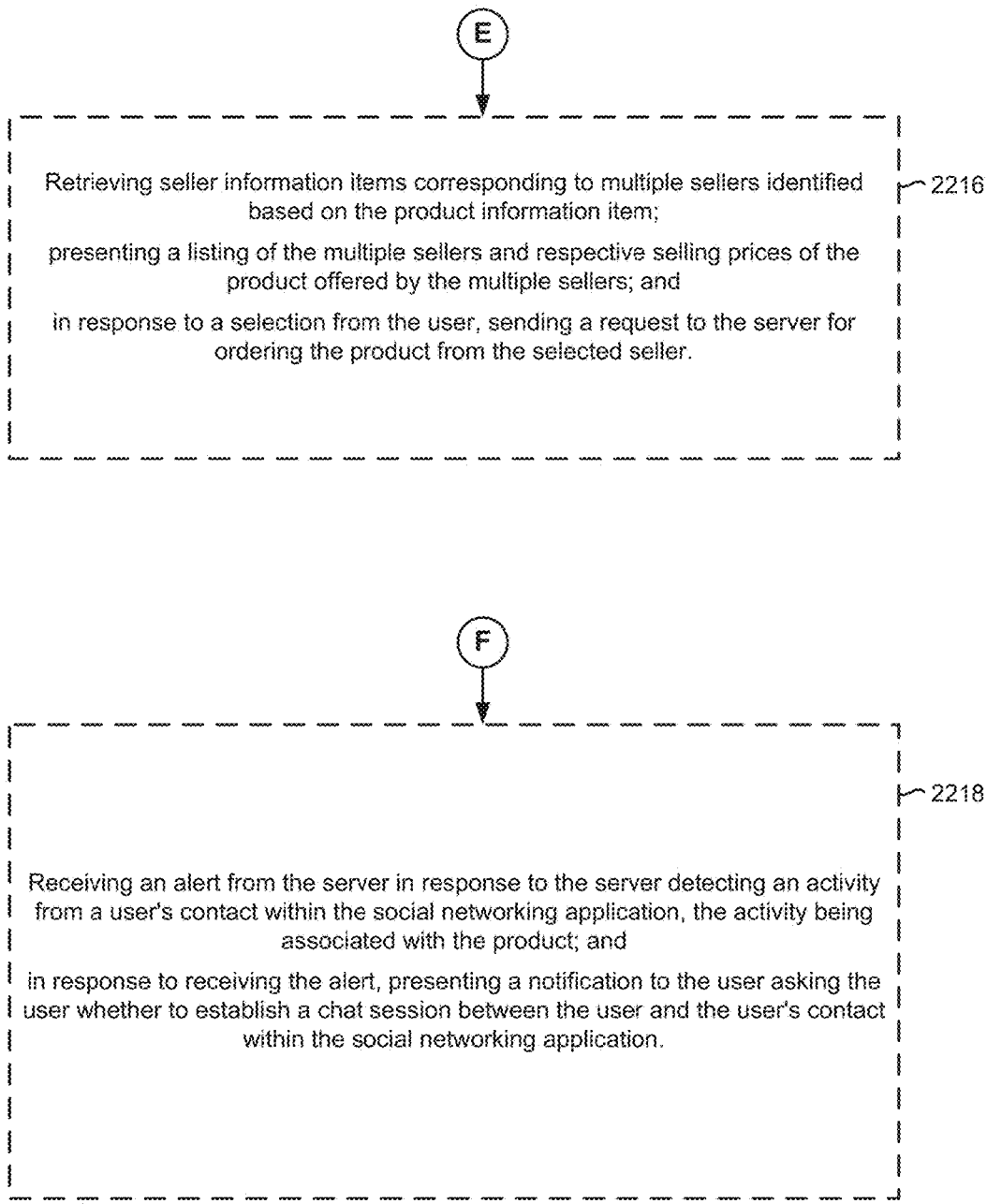

Referring to FIG. 22D, in some embodiments, the electronic device retrieves (2216) seller information items corresponding to multiple sellers (e.g., a listing of sellers 2114, FIG. 21C) identified based on the product information item. The electronic device presents (2216) a listing of the multiple sellers and respective selling prices of the product offered by the multiple sellers. In response to a selection from the user, the electronic device sends (2216) a request to the server for ordering the product from the selected seller.

In some embodiments, the electronic device receives (2218) an alert from the server in response to the server detecting an activity from a user's contact within the social networking application, the activity being associated with the product. In some embodiments, the activity includes: capturing an audio input associated with the advertisement of the product, sending request to the server to retrieve the product information of the product, or other suitable activities associated with the product, such as favorite, share, review, or comment the product within the social networking application.

In some embodiments, in response to receiving the alert, the electronic device presents (2218) a notification to the user asking the user whether to establish a chat session between the user and the user's contact within the social networking application (e.g., as shown in FIG. 21E).

Each of the methods described herein is typically governed by instructions that are stored in a computer readable storage medium and that are executed by one or more processors of one or more servers or electronic device devices. The above identified modules or programs (i.e., sets of instructions) need not be implemented as separate software programs, procedures or modules, and thus various subsets of these modules will be combined or otherwise re-arranged in various embodiments.

The foregoing description, for purpose of explanation, has been described with reference to specific embodiments. However, the illustrative discussions above are not intended to be exhaustive or to limit the disclosed technology to the precise forms disclosed. Many modifications and variations are possible in view of the above teachings. The embodiments were chosen and described in order to best explain the principles of the disclosed technology and its practical applications, to thereby enable others skilled in the art to best utilize the disclosed technology and various embodiments with various modifications as are suited to the particular use contemplated.

What is claimed is:

1. A method for obtaining information based on an audio input, comprising:
   at an electronic device having one or more processors and memory:
   while running a social networking application:
      sending a first audio input to a server hosting the social networking application, wherein the first audio input is captured in response to a triggering event;
      retrieving, from the server, a product information item associated with a product identified based on the first audio input, wherein the product information item is obtained by comparing at least one audio feature of the first audio input with signature audio features extracted from audio of TV or radio broadcast within a predetermined time span; and
      displaying the retrieved product information item to a user of the electronic device within the social networking application;
      in response to an interaction from the user indicating an intent to order the product, sending a request to the server for ordering the product using a transaction account associated with the user within the social networking application.

2. The method of claim 1, wherein:
   the first audio input comprises an audio recording of at least a portion of a first advertisement for a product broadcast on TV at a first time;
   the at least one audio feature of the first audio input matches a first signature audio feature extracted from the first advertisement for the product broadcast on TV on a first channel at the first time; and
   the product information item is identified based on advertisement information associated with the first channel and the first time.

3. The method of claim 1, wherein:
   the trigger event includes receiving a voice instruction from the user of the electronic device, the voice instruction including one or more keywords;
   the first audio input comprises an audio recording of at least a portion of a first program broadcast on TV at a first time;
   the at least one audio feature of the first audio input matches a first signature audio feature extracted from the first program broadcast on TV on a first channel at the first time; and
   the product information item is identified based on the first channel, the first time, and the one or more keywords.

4. The method of claim 1, wherein:
   the product information item includes a phone number for calling a seller to order the product; and
   the method further comprises:
      sending a request to initiate a telephone call to the seller using the telephone number; and
      in response to establishing a live connection with the seller on the phone, sending a notification to the user to join the telephone call to the seller on the electronic device.

5. The method of claim 1, further comprising:
   retrieving seller information items corresponding to multiple sellers identified based on the product information item;
   presenting a listing of the multiple sellers and respective selling prices of the product offered by the multiple sellers; and
   in response to a selection from the user, sending a request to the server for ordering the product from the selected seller.

6. The method of claim 1, further comprising:
   receiving an alert from the server in response to the server detecting an activity from a user's contact within the social networking application, the activity being associated with the product; and
   in response to receiving the alert, presenting a notification to the user asking the user whether to establish a chat session between the user and the user's contact within the social networking application.

7. An electronic device, comprising:
   one or more processors; and
   memory storing one or more programs to be executed by the one or more processors, the one or more programs comprising instructions for:
   while running a social networking application:
      sending a first audio input to a server hosting the social networking application, wherein the first audio input is captured in response to a triggering event;
      retrieving, from the server, a product information item associated with a product identified based on the first audio input, wherein the product information item is obtained by comparing at least one audio feature of the first audio input with signature audio features extracted from audio of TV or radio broadcast within a predetermined time span; and
      displaying the retrieved product information item to a user of the electronic device within the social networking application;
      in response to an interaction from the user indicating an intent to order the product, sending a request to the server for ordering the product using a transaction account associated with the user within the social networking application.

8. The electronic device of claim 7, wherein:
the first audio input comprises an audio recording of at least a portion of a first advertisement for a product broadcast on TV at a first time;
the at least one audio feature of the first audio input matches a first signature audio feature extracted from the first advertisement for the product broadcast on TV on a first channel at the first time; and
the product information item is identified based on advertisement information associated with the first channel and the first time.

9. The electronic device of claim 7, wherein:
the trigger event includes receiving a voice instruction from the user of the electronic device, the voice instruction including one or more keywords;
the first audio input comprises an audio recording of at least a portion of a first program broadcast on TV at a first time;
the at least one audio feature of the first audio input matches a first signature audio feature extracted from the first program broadcast on TV on a first channel at the first time; and
the product information item is identified based on the first channel, the first time, and the one or more keywords.

10. The electronic device of claim 7, wherein:
the product information item includes a phone number for calling a seller to order the product; and
the one or more programs further comprise instructions for:
sending a request to initiate a telephone call to the seller using the telephone number; and
in response to establishing a live connection with the seller on the phone, sending a notification to the user to join the telephone call to the seller on the electronic device.

11. The electronic device of claim 7, wherein the one or more programs further comprise instructions for:
retrieving seller information items corresponding to multiple sellers identified based on the product information item;
presenting a listing of the multiple sellers and respective selling prices of the product offered by the multiple sellers; and
in response to a selection from the user, sending a request to the server for ordering the product from the selected seller.

12. The electronic device of claim 7, wherein the one or more programs further comprise instructions for:
receiving an alert from the server in response to the server detecting an activity from a user's contact within the social networking application, the activity being associated with the product; and
in response to receiving the alert, presenting a notification to the user asking the user whether to establish a chat session between the user and the user's contact within the social networking application.

13. A non-transitory computer readable storage medium storing one or more programs, the one or more programs comprising instructions, which, when executed by an electronic device with one or more processors, cause the electronic device to perform operations comprising:
while running a social networking application:
sending a first audio input to a server hosting the social networking application, wherein the first audio input is captured in response to a triggering event;
retrieving, from the server, a product information item associated with a product identified based on the first audio input, wherein the product information item is obtained by comparing at least one audio feature of the first audio input with signature audio features extracted from audio of TV or radio broadcast within a predetermined time span; and
displaying the retrieved product information item to a user of the electronic device within the social networking application;
in response to an interaction from the user indicating an intent to order the product, sending a request to the server for ordering the product using a transaction account associated with the user within the social networking application.

14. The non-transitory computer readable storage medium of claim 13, wherein:
the first audio input comprises an audio recording of at least a portion of a first advertisement for a product broadcast on TV at a first time;
the at least one audio feature of the first audio input matches a first signature audio feature extracted from the first advertisement for the product broadcast on TV on a first channel at the first time; and
the product information item is identified based on advertisement information associated with the first channel and the first time.

15. The non-transitory computer readable storage medium of claim 13, wherein:
the trigger event includes receiving a voice instruction from the user of the electronic device, the voice instruction including one or more keywords;
the first audio input comprises an audio recording of at least a portion of a first program broadcast on TV at a first time;
the at least one audio feature of the first audio input matches a first signature audio feature extracted from the first program broadcast on TV on a first channel at the first time; and
the product information item is identified based on the first channel, the first time, and the one or more keywords.

16. The non-transitory computer readable storage medium of claim 13, wherein:
the product information item includes a phone number for calling a seller to order the product; and
the one or more programs further comprise instructions which cause the electronic device to perform operations comprising:
sending a request to initiate a telephone call to the seller using the telephone number; and
in response to establishing a live connection with the seller on the phone, sending a notification to the user to join the telephone call to the seller on the electronic device.

17. The non-transitory computer readable storage medium of claim 13, wherein the one or more programs further comprise instructions which cause the electronic device to perform operations comprising:
retrieving seller information items corresponding to multiple sellers identified based on the product information item;
presenting a listing of the multiple sellers and respective selling prices of the product offered by the multiple sellers; and in response to a selection from the user, sending a request to the server for ordering the product from the selected seller.

18. The method of claim 1, wherein:
the interaction from the user indicating an intent to order the product comprises a numerical value transfer instruction;
the transaction account associated with the user within the social networking application is a payment account;
the sending a request to the server for ordering the product using a transaction account associated with the user within the social networking application comprises:
sending a payment request carrying a payment amount, an identity of the payment account, and an identity of a payment receiving account to the server according to the numerical value transfer instruction, so that the server, according to the payment request, subtracts the payment amount from the payment account and adds the payment amount to the payment receiving account according to the payment request.

19. The electronic device of claim 7, wherein:
the interaction from the user indicating an intent to order the product comprises a numerical value transfer instruction;
the transaction account associated with the user within the social networking application is a payment account;
the sending a request to the server for ordering the product using a transaction account associated with the user within the social networking application comprises:
sending a payment request carrying a payment amount, an identity of the payment account, and an identity of a payment receiving account to the server according to the numerical value transfer instruction, so that the server, according to the payment request, subtracts the payment amount from the payment account and adds the payment amount to the payment receiving account according to the payment request.

20. The non-transitory computer readable storage medium of claim 13, wherein:
the interaction from the user indicating an intent to order the product comprises a numerical value transfer instruction;
the transaction account associated with the user within the social networking application is a payment account;
the sending a request to the server for ordering the product using a transaction account associated with the user within the social networking application comprises:
sending a payment request carrying a payment amount, an identity of the payment account, and an identity of a payment receiving account to the server according to the numerical value transfer instruction, so that the server, according to the payment request, subtracts the payment amount from the payment account and adds the payment amount to the payment receiving account according to the payment request.

\* \* \* \* \*